(12) United States Patent
Vankamamidi et al.

(10) Patent No.: US 11,809,720 B2
(45) Date of Patent: *Nov. 7, 2023

(54) TECHNIQUES FOR STORAGE MANAGEMENT

(71) Applicant: EMC IP Holding Company LLC, Hopkinton, MA (US)

(72) Inventors: Vamsi K. Vankamamidi, Hopkinton, MA (US); Philippe Armangau, Acton, MA (US); Shuyu Lee, Acton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/873,647

(22) Filed: Jul. 26, 2022

(65) Prior Publication Data

US 2022/0365692 A1 Nov. 17, 2022

Related U.S. Application Data

(63) Continuation of application No. 17/225,420, filed on Apr. 8, 2021, now Pat. No. 11,429,293.

(51) Int. Cl.
*G06F 3/00* (2006.01)
*G06F 3/06* (2006.01)
*G06F 12/02* (2006.01)

(52) U.S. Cl.
CPC .......... *G06F 3/0631* (2013.01); *G06F 3/0605* (2013.01); *G06F 3/067* (2013.01);
(Continued)

(58) Field of Classification Search
CPC .... G06F 3/0631; G06F 3/0605; G06F 3/0644; G06F 3/0653; G06F 3/0659; G06F 3/067;
(Continued)

(56) References Cited

U.S. PATENT DOCUMENTS 8,793,290 B1* 7/2014 Pruthi .................. G06F 3/0604
707/821
2008/0133767 A1* 6/2008 Birrer ................. H04L 67/1063
709/231

(Continued)

*Primary Examiner* — Craig S Goldschmidt
(74) *Attorney, Agent, or Firm* — Muirhead and Saturnelli, LLC

(57) ABSTRACT

Techniques for managing storage may comprise: receiving a request for a first amount of free capacity, wherein the request includes a first priority denoting a purpose for which the first amount of free capacity is requested; determining whether a current utilization of storage exceeds a first threshold associated with the first priority; responsive to determining the current utilization of storage is less than the first threshold associated with the first priority, performing first processing including: determining whether there is a sufficient amount of existing free capacity to grant the first amount; and responsive to determining there is a sufficient amount of existing free capacity to grant the first amount, granting the first amount of free capacity; and responsive to determining the current utilization of storage is not less than the first threshold associated with the first priority, rejecting the request and not granting the first amount of free capacity.

18 Claims, 10 Drawing Sheets

(52) U.S. Cl.
CPC .......... *G06F 3/0644* (2013.01); *G06F 3/0653* (2013.01); *G06F 3/0659* (2013.01); *G06F 3/0689* (2013.01); *G06F 12/0238* (2013.01); *G06F 2212/7201* (2013.01)

(58) Field of Classification Search
CPC ............... G06F 3/0689; G06F 12/0238; G06F 2212/7201
See application file for complete search history.

(56) References Cited

U.S. PATENT DOCUMENTS

2009/0172315 A1* 7/2009 Iyer ...................... G06F 12/126
711/158
2018/0246911 A1* 8/2018 Lee ......................... G06F 16/21

* cited by examiner

| Priority | Purposes of free capacity | Utilization threshold |
|---|---|---|
| 1 | Get out of read only mode. | N/A |
| 2 | Rebuild failed PD. User data has no redundancy. | 80% |
| 3 | Rebuild failed PD. User data has redundancy. | 70% |
| 4 | Replenish exhausted hot spare. | 60% |
| 5 | Proactively copy data off of failing PD. | 50% |
| 6 | Proactively copy data off of worn out PD. | 40% |
| 7 | Copy data off of healthy PD (user requested). | 30% |

FIG. 8

TECHNIQUES FOR STORAGE MANAGEMENT

BACKGROUND

Technical Field

This application generally relates to data storage.

Description of Related Art

Systems may include different resources used by one or more host processors. The resources and the host processors in the system may be interconnected by one or more communication connections, such as network connections. These resources may include data storage devices such as those included in data storage systems. The data storage systems may be coupled to one or more host processors and provide storage services to each host processor. Multiple data storage systems from one or more different vendors may be connected and may provide common data storage for the one or more host processors.

A host may perform a variety of data processing tasks and operations using the data storage system. For example, a host may issue I/O operations, such as data read and write operations, received at a data storage system. The host systems may store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device may also be provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host may be directed to a particular storage entity, such as a file or logical device. The logical devices may or may not correspond to the actual physical drives. Allowing multiple host systems to access the single data storage system allows the host systems to share data stored therein.

SUMMARY OF THE INVENTION

Various embodiments of the techniques herein may include a method, a system and a computer readable medium for managing storage comprising: receiving a request for a first amount of free capacity, wherein the request includes a first priority denoting a purpose for which the first amount of free capacity is requested; determining whether a current utilization of storage exceeds a first threshold associated with the first priority; responsive to determining the current utilization of storage is less than the first threshold associated with the first priority, performing first processing including: determining whether there is a sufficient amount of existing free capacity to grant the first amount; and responsive to determining there is a sufficient amount of existing free capacity to grant the first amount, granting the first amount of free capacity; and responsive to determining the current utilization of storage is not less than the first threshold associated with the first priority, rejecting the request and not granting the first amount of free capacity. The request may be a request for the first amount of free capacity from non-volatile physical storage devices providing backend storage in a data storage system. The current utilization may denote a percentage regarding an amount of the physical storage of the non-volatile physical storage devices of the data storage system that is used or allocated. The first threshold may be one of a plurality of predetermined thresholds associated with a plurality of predetermined purposes or reasons for requesting free capacity, and wherein each of the plurality of predetermined thresholds may be associated with a different one of a plurality of priorities, and wherein the plurality of priorities may include the first priority of the request. Each of the plurality of predetermined thresholds may denote a different utilization threshold. The plurality of priorities may be ranked from a highest priority to a lowest priority and wherein the highest priority may be associated with a highest one of the plurality of predetermined thresholds and the lowest priority may be associated with a lowest one of the plurality of predetermined thresholds.

In at least one embodiment, the first threshold may denote a utilization threshold that is threshold percentage regarding an amount of the physical storage of the non-volatile physical storage devices of the data storage system that is used or allocated. The non-volatile physical storage devices providing backend storage in a data storage system may include a first portion configured as a user data pool for storing user data and a second portion configured as a metadata pool for storing metadata. The metadata may include mapping information used to map logical addresses to physical locations on the non-volatile physical storage devices of the data storage system.

In at least one embodiment, determining whether there is a sufficient amount of existing free capacity to grant the first amount may include determining that the user data pool includes a sufficient amount of existing free capacity to grant the first amount, and processing may include granting the first amount using free capacity from the user data pool. The user data pool may be configured in accordance with a first RAID level and configuration and the metadata pool may be configured in accordance with a second RAID level and configuration different from the first RAID level and configuration.

In at least one embodiment, determining whether there is a sufficient amount of existing free capacity to grant the first amount may include determining that the metadata pool includes a sufficient amount of existing free capacity to grant the first amount, and processing may include granting the first amount using free capacity from the metadata pool. The user data pool and the metadata pool may be configured in accordance with a same RAID level and configuration.

In at least one embodiment, processing may include: determining that the data storage system is in a read only mode; determining that the user data pool has a first current amount of free capacity below a specified threshold; responsive to determining that the user data pool has the first current amount of free capacity below the specified threshold, shifting free capacity from the metadata pool to the user data pool to increase free capacity of the user data pool; and in response to increasing free capacity of the user data pool, transitioning the data storage system out of read only mode so that the data storage system is able to service write requests. When in the read only mode, the data storage system may only service read requests and may not service other requests that result in consumption of physical storage of the non-volatile physical storage devices providing backend storage in the data storage system. When in the read only mode, the data storage system may not service write requests.

BRIEF DESCRIPTION OF THE DRAWINGS

Features and advantages of the present invention will become more apparent from the following detailed description of exemplary embodiments thereof taken in conjunction with the accompanying drawings in which:

FIG. 8 is an example of a table of information that may be used in an embodiment in accordance with the techniques herein.

DETAILED DESCRIPTION OF EMBODIMENT(S)

Figure 1:
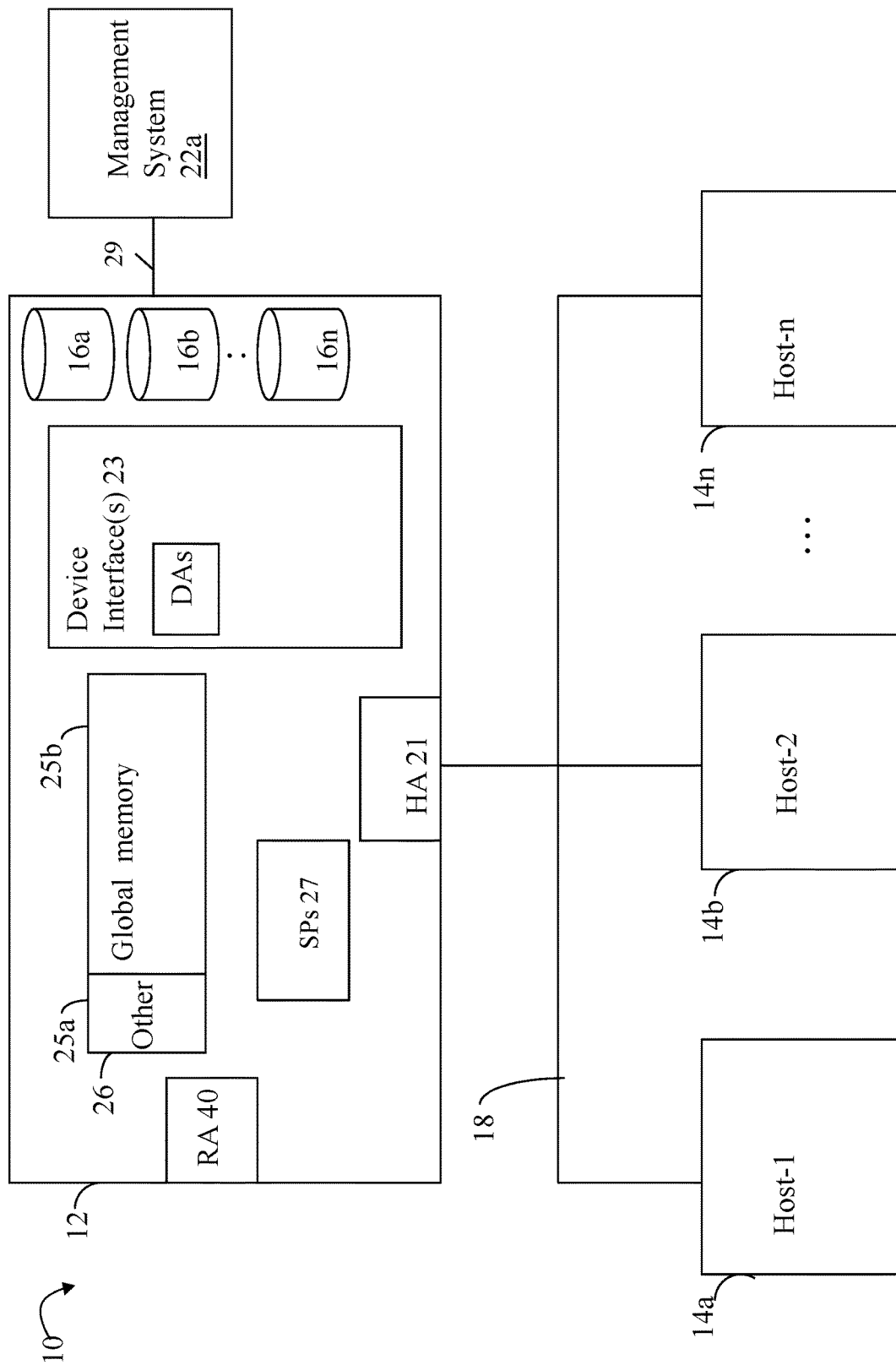
FIG. 1 is an example of components that may be included in a system in accordance with the techniques described herein.

Referring to the FIG. 1, shown is an example of an embodiment of a system 10 that may be used in connection with performing the techniques described herein. The system 10 includes a data storage system 12 connected to the host systems (also sometimes referred to as hosts) 14a-14n through the communication medium 18. In this embodiment of the system 10, the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host systems 14a-14n and data storage system 12 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the hosts 14a-14n and the data storage system 12 may all be located at the same physical site, or, alternatively, may also be located in different physical locations. The communication medium 18 used for communication between the host systems 14a-14n and the data storage system 12 of the system 10 may use a variety of different communication protocols such as block-based protocols (e.g., SCSI, Fibre Channel, iSCSI), file system-based protocols (e.g., NFS or network file server), and the like. Some or all of the connections by which the hosts 14a-14n and the data storage system 12 may be connected to the communication medium 18 may pass through other communication devices, such as switching equipment, a phone line, a repeater, a multiplexer or even a satellite.

Each of the host systems 14a-14n may perform data operations. In the embodiment of the FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although the element 12 is illustrated as a single data storage system, such as a single data storage array, the element 12 may also represent, for example, multiple data storage arrays alone, or in combination with, other data storage devices, systems, appliances, and/or components having suitable connectivity, such as in a SAN (storage area network) or LAN (local area network), in an embodiment using the techniques herein. It should also be noted that an embodiment may include data storage arrays or other components from one or more vendors. In subsequent examples illustrating the techniques herein, reference may be made to a single data storage array by a vendor. However, as will be appreciated by those skilled in the art, the techniques herein are applicable for use with other data storage arrays by other vendors and with other components than as described herein for purposes of example.

The data storage system 12 may be a data storage appliance or a data storage array including a plurality of data storage devices (PDs) 16a-16n. The data storage devices 16a-16n may include one or more types of data storage devices such as, for example, one or more rotating disk drives and/or one or more solid state drives (SSDs). An SSD is a data storage device that uses solid-state memory to store persistent data. SSDs may refer to solid state electronics devices as distinguished from electromechanical devices, such as hard drives, having moving parts. Flash devices or flash memory-based SSDs are one type of SSD that contains no moving mechanical parts. The flash devices may be constructed using nonvolatile semiconductor NAND flash memory. The flash devices may include, for example, one or more SLC (single level cell) devices and/or MLC (multi level cell) devices.

The data storage array may also include different types of controllers, adapters or directors, such as an HA 21 (host adapter), RA 40 (remote adapter), and/or device interface(s) 23. Each of the adapters (sometimes also known as controllers, directors or interface components) may be implemented using hardware including a processor with a local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from one of the hosts 14a-n. The data storage array may include one or more RAs that may be used, for example, to facilitate communications between data storage arrays. The data storage array may also include one or more device interfaces 23 for facilitating data transfers to/from the data storage devices 16a-16n. The data storage device interfaces 23 may include device interface modules, for example, one or more disk adapters (DAs) (e.g., disk controllers) for interfacing with the flash drives or other physical storage devices (e.g., PDS 16a-n). The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, the HAs and/or the RAs in a data storage array. In one embodiment, the device interfaces 23 may perform data operations using a system cache that may be included in the global memory 25b, for example, when communicating with other device interfaces and other components of the data storage array. The other portion 25a is that portion of the memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

The host systems 14a-14n provide data and access control information through channels to the storage systems 12, and the storage systems 12 may also provide data to the host systems 14a-n also through the channels. The host systems 14a-n do not address the drives or devices 16a-16n of the storage systems directly, but rather access to data may be provided to one or more host systems from what the host systems view as a plurality of logical devices, logical volumes (LVs) which may also referred to herein as logical units (e.g., LUNs). A logical unit (LUN) may be characterized as a disk array or data storage system reference to an amount of storage space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives or more generally physical storage devices. For example, one or more LUNs may reside on a single physical disk drive, data of a single LUN may reside on multiple different physical devices, and the like. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may include one or more type of device interface used in connection with facilitating data transfers to/from the associated disk drive(s) and LUN (s) residing thereon. For example, such device interfaces may include a device interface used in connection with facilitating data transfers to/from the associated flash devices and LUN(s) residing thereon. It should be noted that an embodiment may use the same or a different device interface for one or more different types of devices than as described herein.

In an embodiment in accordance with the techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

It should be noted that although examples of the techniques herein may be made with respect to a physical data storage system and its physical components (e.g., physical hardware for each HA, DA, HA port and the like), the techniques herein may be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22a that may be used to manage and monitor the data storage system 12. In one embodiment, the management system 22a may be a computer system which includes data storage system management software or application such as may execute in a web browser. A data storage system manager may, for example, view information about a current data storage configuration such as LUNs, groups of LUNs, and the like, on a user interface (UI) in a display device of the management system 22a. Alternatively, and more generally, the management software may execute on any suitable processor in any suitable system. For example, the data storage system management software may execute on a processor of the data storage system 12.

Information regarding the data storage system configuration may be stored in any suitable data container, such as a database. The data storage system configuration information stored in the database may generally describe the various physical and logical entities in the current data storage system configuration. The data storage system configuration information may describe, for example, the LUNs configured in the system, properties and status information of the configured LUNs (e.g., LUN storage capacity, unused or available storage capacity of a LUN, consumed or used capacity of a LUN), configured RAID groups, properties and status information of the configured RAID groups (e.g., the RAID level of a RAID group, the particular PDs that are members of the configured RAID group), the PDs in the system, properties and status information about the PDs in the system, local replication configurations and details of existing local replicas (e.g., a schedule or other trigger conditions of when a snapshot is taken of one or more LUNs, identify information regarding existing snapshots for a particular LUN), remote replication configurations (e.g., for a particular LUN on the local data storage system, identify the LUN's corresponding remote counterpart LUN and the remote data storage system on which the remote LUN is located), data storage system performance information such as regarding various storage objects and other entities in the system, and the like.

Consistent with other discussion herein, management commands issued over the control or data path may include commands that query or read selected portions of the data storage system configuration, such as information regarding the properties or attributes of one or more LUNs. The management commands may also include commands that write, update, or modify the data storage system configuration, such as, for example, to create or provision a new LUN (e.g., which may result in modifying one or more database tables such as to add information for the new LUN), to modify an existing replication schedule or configuration (e.g., which may result in updating existing information in one or more database tables for the current replication schedule or configuration), to delete a LUN (e.g., which may include deleting the LUN from a table of defined LUNs and may also include modifying one or more other database tables to delete any existing snapshots of the LUN being deleted), and the like.

In some embodiments, each of the different controllers or adapters, such as each HA, DA, RA, and the like, may be implemented as a hardware component including, for example, one or more processors, one or more forms of memory, and the like. Code may be stored in one or more of the memories of the component for performing processing.

The device interface, such as a DA, performs I/O operations on a physical device or drive 16a-16n. In the following description, data residing on a LUN may be accessed by the device interface following a data request in connection with I/O operations. For example, a host may issue an I/O operation which is received by the HA 21. The I/O operation may identify a target logical address from which data is read from, or written to, depending on whether the I/O operation is, respectively, a read or a write operation request. The target logical address of the received I/O operation may be expressed in terms of a LUN and logical address or offset location (e.g., LBA or logical block address) on the LUN. Processing may be performed on the data storage system to further map the target logical address of the received I/O operation, expressed in terms of a LUN and logical address or offset location on the LUN, to its corresponding physical storage device (PD) and location on the PD. The DA which services the particular PD may further perform processing to either read data from, or write data to, the corresponding physical device location for the I/O operation.

It should be noted that an embodiment of a data storage system may include components having different names from that described herein but which perform functions similar to components as described herein. Additionally, components within a single data storage system, and also between data storage systems, may communicate using any suitable technique that may differ from that as described herein for exemplary purposes. For example, element 12 of the FIG. 1 may be a data storage system, such as a data storage array, that includes multiple storage processors (SPs). Each of the SPs 27 may be a CPU including one or more "cores" or processors and each may have their own memory used for communication between the different front end and back end components rather than utilize a global memory accessible to all storage processors. In such embodiments, the memory 26 may represent memory of each such storage processor.

Generally, the techniques herein may be used in connection with any suitable storage system, appliance, device, and the like, in which data is stored. For example, an embodiment may implement the techniques herein using a midrange data storage system, such as a Dell EMC Unity® data storage system or a Dell EMC PowerStore® data storage system, as well as a high end or enterprise data storage system, such as a Dell EMC™ PowerMAX™ data storage system.

The data path or I/O path may be characterized as the path or flow of I/O data through a system. For example, the data or I/O path may be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receive a response (possibly including requested data) in connection such I/O commands.

The control path, also sometimes referred to as the management path, may be characterized as the path or flow of data management or control commands through a system. For example, the control or management path may be the logical flow through hardware and software components or layers in connection with issuing data storage management command to and/or from a data storage system, and also receiving responses (possibly including requested data) to such control or management commands. For example, with reference to the FIG. 1, the control commands may be issued from data storage management software executing on the management system 22a to the data storage system 12. Such commands may be, for example, to establish or modify data services, provision storage, perform user account management, and the like. Consistent with other discussion herein, the management commands may result in processing that includes reading and/or modifying information in the database storing data storage system configuration information. For example, management commands that read and/or modify the data storage system configuration information in the database may be issued over the control path to provision storage for LUNs, create a snapshot, define conditions of when to create another snapshot, define or establish local and/or remote replication services, define or modify a schedule for snapshot or other data replication services, define a RAID group, obtain data storage management and configuration information for display in a graphical user interface (GUI) of a data storage management program or application, generally modify one or more aspects of a data storage system configuration, list properties and status information regarding LUNs or other storage objects (e.g., physical and/or logical entities in the data storage system), and the like.

The data path and control path define two sets of different logical flow paths. In at least some of the data storage system configurations, at least part of the hardware and network connections used for each of the data path and control path may differ. For example, although both control path and data path may generally use a network for communications, some of the hardware and software used may differ. For example, with reference to the FIG. 1, a data storage system may have a separate physical connection 29 from a management system 22a to the data storage system 12 being managed whereby control commands may be issued over such a physical connection 29. However, it may be that user I/O commands are never issued over such a physical connection 29 provided solely for purposes of connecting the management system to the data storage system. In any case, the data path and control path each define two separate logical flow paths.

Figure 2:
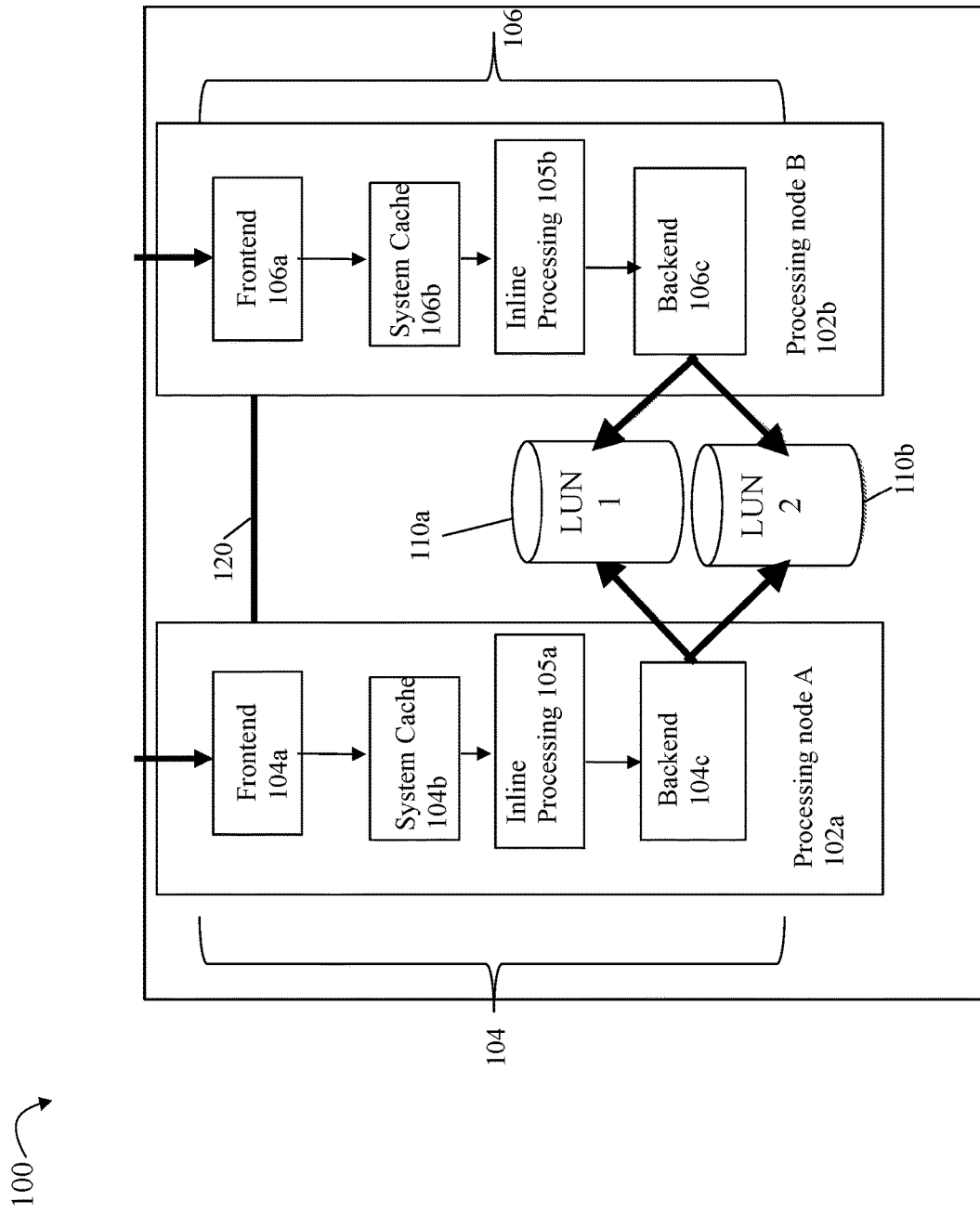
FIG. 2 is an example illustrating the I/O path or data path in connection with processing data in an embodiment in accordance with the techniques herein.

With reference to the FIG. 2, shown is an example 100 illustrating components that may be included in the data path in at least one existing data storage system in accordance with the techniques herein. The example 100 includes two processing nodes A 102a and B 102b and the associated software stacks 104, 106 of the data path, where I/O requests may be received by either processing node 102a or 102b. In the example 200, the data path 104 of processing node A 102a includes: the frontend (FE) component 104a (e.g., an FA or front end adapter) that translates the protocol-specific request into a storage system-specific request; a system cache layer 104b where data is temporarily stored; an inline processing layer 105a; and a backend (BE) component 104c that facilitates movement of the data between the system cache and non-volatile physical storage (e.g., back end physical non-volatile storage devices or PDs accessed by BE components such as DAs as described herein). During movement of data in and out of the system cache layer 104b (e.g., such as in connection with read data from, and writing data to, physical storage 110a, 110b), inline processing may be performed by layer 105a. Such inline processing operations of 105a may be optionally performed and may include any one of more data processing operations in connection with data that is flushed from system cache layer 104b to the back-end non-volatile physical storage 110a, 110b, as well as when retrieving data from the back-end non-volatile physical storage 110a, 110b to be stored in the system cache layer 104b. In at least one embodiment, the inline processing may include, for example, performing one or more data reduction operations such as data deduplication or data compression. The inline processing may include performing any suitable or desirable data processing operations as part of the I/O or data path.

In a manner similar to that as described for data path 104, the data path 106 for processing node B 102b has its own FE component 106a, system cache layer 106b, inline processing layer 105b, and BE component 106c that are respectively similar to the components 104a, 104b, 105a and 104c. The elements 110a, 110b denote the non-volatile BE physical storage provisioned from PDs for the LUNs, whereby an I/O may be directed to a location or logical address of a LUN and where data may be read from, or written to, the logical address. The LUNs 110a, 110b are examples of storage objects representing logical storage entities included in an existing data storage system configuration. Since, in this example, writes directed to the LUNs 110a, 110b may be received for processing by either of the nodes 102a and 102b, the example 100 illustrates what may also be referred to as an active-active configuration.

In connection with a write operation as may be received from a host and processed by the processing node A 102a, the write data may be written to the system cache 104b, marked as write pending (WP) denoting it needs to be written to the physical storage 110a, 110b and, at a later point in time, the write data may be destaged or flushed from the system cache to the physical storage 110a, 110b by the BE component 104c. The write request may be considered complete once the write data has been stored in the system cache whereby an acknowledgement regarding the completion may be returned to the host (e.g., by component the 104a). At various points in time, the WP data stored in the system cache is flushed or written out to the physical storage 110a, 110b.

In connection with the inline processing layer 105a, prior to storing the original data on the physical storage 110a, 110b, one or more data reduction operations may be performed. For example, the inline processing may include performing data compression processing, data deduplication processing, and the like, that may convert the original data (as stored in the system cache prior to inline processing) to a resulting representation or form which is then written to the physical storage 110a, 110b.

In connection with a read operation to read a block of data, a determination is made as to whether the requested read data block is stored in its original form (in system cache 104b or on physical storage 110a, 110b), or whether the requested read data block is stored in a different modified form or representation. If the requested read data block (which is stored in its original form) is in the system cache, the read data block is retrieved from the system cache 104b and returned to the host. Otherwise, if the requested read data block is not in the system cache 104b but is stored on the physical storage 110a, 110b in its original form, the requested data block is read by the BE component 104c from the backend storage 110a, 110b, stored in the system cache and then returned to the host.

If the requested read data block is not stored in its original form, the original form of the read data block is recreated and stored in the system cache in its original form so that it can be returned to the host. Thus, requested read data stored on physical storage 110a, 110b may be stored in a modified form where processing is performed by 105a to restore or convert the modified form of the data to its original data form prior to returning the requested read data to the host.

Also illustrated in FIG. 2 is an internal network interconnect 120 between the nodes 102a, 102b. In at least one embodiment, the interconnect 120 may be used for internode communication between the nodes 102a, 102b.

In connection with at least one embodiment in accordance with the techniques herein, each processor or CPU may include its own private dedicated CPU cache (also sometimes referred to as processor cache) that is not shared with other processors. In at least one embodiment, the CPU cache, as in general with cache memory, may be a form of fast memory (relatively faster than main memory which may be a form of RAM). In at least one embodiment, the CPU or processor cache is on the same die or chip as the processor and typically, like cache memory in general, is far more expensive to produce than normal RAM such as may be used as main memory. The processor cache may be substantially faster than the system RAM such as used as main memory and contains information that the processor will be immediately and repeatedly accessing. The faster memory of the CPU cache may, for example, run at a refresh rate that's closer to the CPU's clock speed, which minimizes wasted cycles. In at least one embodiment, there may be two or more levels (e.g., L1, L2 and L3) of cache. The CPU or processor cache may include at least an L1 level cache that is the local or private CPU cache dedicated for use only by that particular processor. The two or more levels of cache in a system may also include at least one other level of cache (LLC or lower level cache) that is shared among the different CPUs. The L1 level cache serving as the dedicated CPU cache of a processor may be the closest of all cache levels (e.g., L1-L3) to the processor which stores copies of the data from frequently used main memory locations. Thus, the system cache as described herein may include the CPU cache (e.g., the L1 level cache or dedicated private CPU/processor cache) as well as other cache levels (e.g., the LLC) as described herein. Portions of the LLC may be used, for example, to initially cache write data which is then flushed to the backend physical storage such as BE PDs providing non-volatile storage. For example, in at least one embodiment, a RAM based memory may be one of the caching layers used as to cache the write data that is then flushed to the backend physical storage. When the processor performs processing, such as in connection with the inline processing 105a, 105b as noted above, data may be loaded from the main memory and/or other lower cache levels into its CPU cache.

In at least one embodiment, the data storage system may be configured to include one or more pairs of nodes, where each pair of nodes may be generally as described and represented as the nodes 102a-b in the FIG. 2. For example, a data storage system may be configured to include at least one pair of nodes and at most a maximum number of node pairs, such as for example, a maximum of 4 node pairs. The maximum number of node pairs may vary with embodiment. In at least one embodiment, a base enclosure may include the minimum single pair of nodes and up to a specified maximum number of PDs. In some embodiments, a single base enclosure may be scaled up to have additional BE non-volatile storage using one or more expansion enclosures, where each expansion enclosure may include a number of additional PDs. Further, in some embodiments, multiple base enclosures may be grouped together in a load-balancing cluster to provide up to the maximum number of node pairs. Consistent with other discussion herein, each node may include one or more processors and memory. In at least one embodiment, each node may include two multi-core processors with each processor of the node having a core count of between 8 and 28 cores. In at least one embodiment, the PDs may all be non-volatile SSDs, such as flash-based storage devices and storage class memory (SCM) devices. It should be noted that the two nodes configured as a pair may also sometimes be referred to as peer nodes. For example, the node A 102a is the peer node of the node B 102b, and the node B 102b is the peer node of the node A 102a.

In at least one embodiment, the data storage system may be configured to provide both block and file storage services with a system software stack that includes an operating system running directly on the processors of the nodes of the system.

In at least one embodiment, the data storage system may be configured to provide block-only storage services (e.g., no file storage services). A hypervisor may be installed on each of the nodes to provide a virtualized environment of virtual machines (VMs). The system software stack may execute in the virtualized environment deployed on the hypervisor. The system software stack (sometimes referred to as the software stack or stack) may include an operating system running in the context of a VM of the virtualized environment. Additional software components may be included in the system software stack and may also execute in the context of a VM of the virtualized environment.

In at least one embodiment, each pair of nodes may be configured in an active-active configuration as described elsewhere herein, such as in connection with FIG. 2, where each node of the pair has access to the same PDs providing BE storage for high availability. With the active-active configuration of each pair of nodes, both nodes of the pair process I/O operations or commands and also transfer data to and from the BE PDs attached to the pair. In at least one embodiment, BE PDs attached to one pair of nodes may not be shared with other pairs of nodes. A host may access data stored on a BE PD through the node pair associated with or attached to the PD.

In at least one embodiment, each pair of nodes provides a dual node architecture where both nodes of the pair may be identical in terms of hardware and software for redundancy and high availability. Consistent with other discussion herein, each node of a pair may perform processing of the different components (e.g., FA, DA, and the like) in the data path or I/O path as well as the control or management path. Thus, in such an embodiment, different components, such as the FA, DA and the like of FIG. 1, may denote logical or functional components implemented by code executing on the one or more processors of each node. Thus, in such an embodiment, rather than have dedicated hardware for an FA, DA, and the like, the components described above for the FA, DA, RA, and the like, may be viewed as logical or functional components where the tasks of such components may be implemented by code executed by processors of the nodes as illustrated in FIG. 2. Each node of the pair may include its own resources such as its own local (i.e., used only by the node) resources such as local processor(s), local memory, and the like.

Consistent with other discussion herein, a cache may be used for caching write I/O data and other cached information. The other cached information may include, for example, cached operations or commands such as create snapshot commands. In one system, the cache may be implemented using multiple caching devices or PDs, such as non-volatile (NV) SSDs such as NVRAM devices that are external with respect to both of the nodes or storage controllers. The caching PDs form a shared non-volatile cache accessible to both nodes of the dual node architecture. It should be noted that in a system where the caching devices or PDs are external with respect to the two nodes, the caching devices or PDs are in addition to other non-volatile PDs accessible to both nodes. The additional PDs provide the BE non-volatile storage for the nodes where the cached data stored on the caching devices or PDs is eventually flushed to the BE PDs as discussed elsewhere herein.

In the following paragraphs, the one or more caching devices or PDs provides a persistent cache that may be referred to as a data journal, log or log tier used in the data storage system. In such a system, the caching devices or PDs are non-volatile log devices or PDs upon which the log is persistently stored. In at least one embodiment, in addition to such a persistently stored log, one or more of the nodes may also include node-local in-memory copies of information of the log.

In a data storage system, minimizing the latency of I/O requests is a critical performance metric. In at least one data storage system using the dual node architecture such as described in connection with FIG. 2, for write operations, latency is determined by the amount of time taken to store the write data in the log where the write data is visible to both nodes or controllers of the system.

Consistent with other discussion herein, the log may be used to optimize write operation latency. Generally, the write operation writing data is received by the data storage system from a host or other client. The data storage system then performs processing to persistently record the write operation in the log. Once the write operation is persistently recorded in the log, the data storage system may send an acknowledgement to the client regarding successful completion of the write operation. At some point in time subsequent to logging the write operation the log, the write operation is flushed or destaged from the log to the BE PDs. In connection with flushing the recorded write operation from the log, the data written by the write operation is stored on non-volatile physical storage of a BE PD. The space of the log used to record the write operation that has been flushed may now be reclaimed for reuse. The write operation may be recorded in the log in any suitable manner and may include, for example, recording a target logical address to which the write operation is directed and recording the data written to the target logical address by the write operation.

In the log, each logged operation may be recorded in the next logically sequential record of the log. For example, logged write I/O and write data (e.g., write I/O payload) may be recorded in a next logically sequential record of the log. The log may be circular in nature in that once a write operation is recorded in the last record of the log, recording of the next write proceeds with recording in the first record of the log.

The typical I/O pattern for the log as a result of recording write I/Os and possibly other information in successive consecutive log records includes logically sequential and logically contiguous writes (e.g., logically with respect to the logical offset or ordering within the log). Data may also be read from the log as needed (e.g., depending on the particular use or application of the log) so typical I/O patterns may also include reads. The log may have a physical storage layout corresponding to the sequential and contiguous order in which the data is written to the log. Thus, the log data may be written to sequential and consecutive physical storage locations in a manner corresponding to the logical sequential and contiguous order of the data in the log. Additional detail regarding use and implementation of the log in at least one embodiment in accordance with the techniques herein is provided below.

Figure 3:
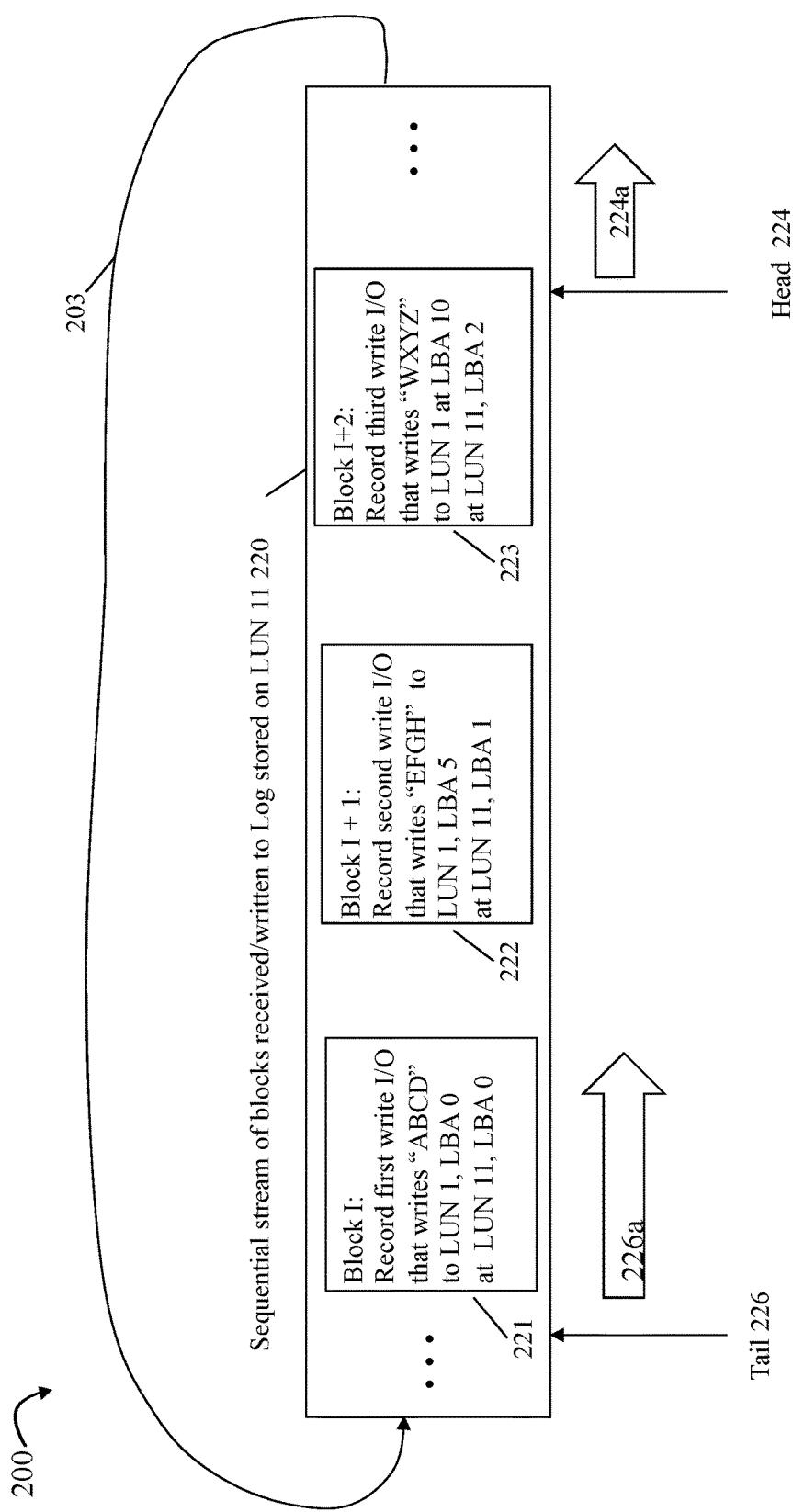
FIGS. 3, 4, 5 and 6 are examples illustrating use of a log structured system in an embodiment in accordance with the techniques herein.

Referring to FIG. 3, shown is an example 200 illustrating a sequential stream 220 of operations or requests received that are written to a log in an embodiment in accordance with techniques herein. In this example, the log may be stored on the LUN 11 where logged operations or requests, such as write I/Os that write user data to a file, target LUN or other storage object, are recorded as records in the log. The element 220 includes information or records of the log for 3 write I/Os or updates which are recorded in the records or blocks I 221, I+1 222 and I+2 223 of the log (e.g., where I denotes an integer offset of a record or logical location in the log). The blocks I 221, I+1 222, and I+2 223 may be written sequentially in the foregoing order for processing in the data storage system. The block 221 may correspond to the record or block I of the log stored at LUN 11, LBA 0 that logs a first write I/O operation. The first write I/O operation may write "ABCD" to the target logical address LUN 1, LBA 0. The block 222 may correspond to the record or block I+1 of the log stored at LUN 11, LBA 1 that logs a second write I/O operation. The second write I/O operation may write "EFGH" to the target logical address LUN 1, LBA 5. The block 223 may correspond to the record or block I+2 of the log stored at LUN 11, LBA 2 that logs a third write I/O operation. The third write I/O operation may write "WXYZ" to the target logical address LUN 1, LBA 10. Thus, each of the foregoing 3 write I/O operations logged in 221, 222 and 223 write to 3 different logical target addresses or locations each denoted by a target LUN and logical offset on the target LUN. As illustrated in the FIG. 3, the information recorded in each of the foregoing records or blocks 221, 222 and 223 of the log may include the target logical address to which data is written and the write data written to the target logical address.

The head pointer 224 may denote the next free record or block of the log used to record or log the next write I/O operation. The head pointer may be advanced 224a to the next record or log in the log as each next write I/O operation is recorded. When the head pointer 224 reaches the end of the log by writing to the last sequential block or record of the log, the head pointer may advance 203 to the first sequential block or record of the log in a circular manner and continue processing. The tail pointer 226 may denote the next record or block of a recorded write I/O operation in the log to be destaged and flushed from the log. Recorded or logged write I/Os of the log are processed and flushed whereby the recorded write I/O operation that writes to a target logical address or location (e.g., target LUN and offset) is read from the log and then executed or applied to a non-volatile BE PD location mapped to the target logical address (e.g., where the BE PD location stores the data content of the target logical address). Thus, as records are flushed from the log, the tail pointer 226 may logically advance 226a sequentially (e.g., advance to the right toward the head pointer and toward the end of the log) to a new tail position. Once a record or block of the log is flushed, the record or block is freed for reuse in recording another write I/O operation. When the tail pointer reaches the end of the log by flushing the last sequential block or record of the log, the tail pointer may advance 203 to the first sequential block or record of the log in a circular manner and continue processing. Thus, the circular logical manner in which the records or blocks of the log are processed form a ring buffer in which the write I/Os are recorded.

When a write I/O operation writing user data to a target logical address is persistently recorded and stored in the non-volatile log, the write I/O operation is considered complete and may be acknowledged as complete to the host or other client originating the write I/O operation to reduce the write I/O latency and response time. The write I/O operation and write data are destaged at a later point in time during a flushing process that flushes a recorded write of the log to the BE non-volatile PDs, updates and writes any corresponding metadata for the flushed write I/O operation, and frees the record or block of the log (e.g., where the record or block logged the write I/O operation just flushed). The metadata that may be updated as part of the flushing process for the target logical address of the write I/O operation may include mapping information as described elsewhere herein. The mapping information of the metadata for the target logical address may identify the physical address or location on provisioned physical storage on a non-volatile BE PD storing the data of the target logical address. The target logical address may be, for example, a logical address on a logical device, such as a LUN and offset or LBA on the LUN.

Figure 4:
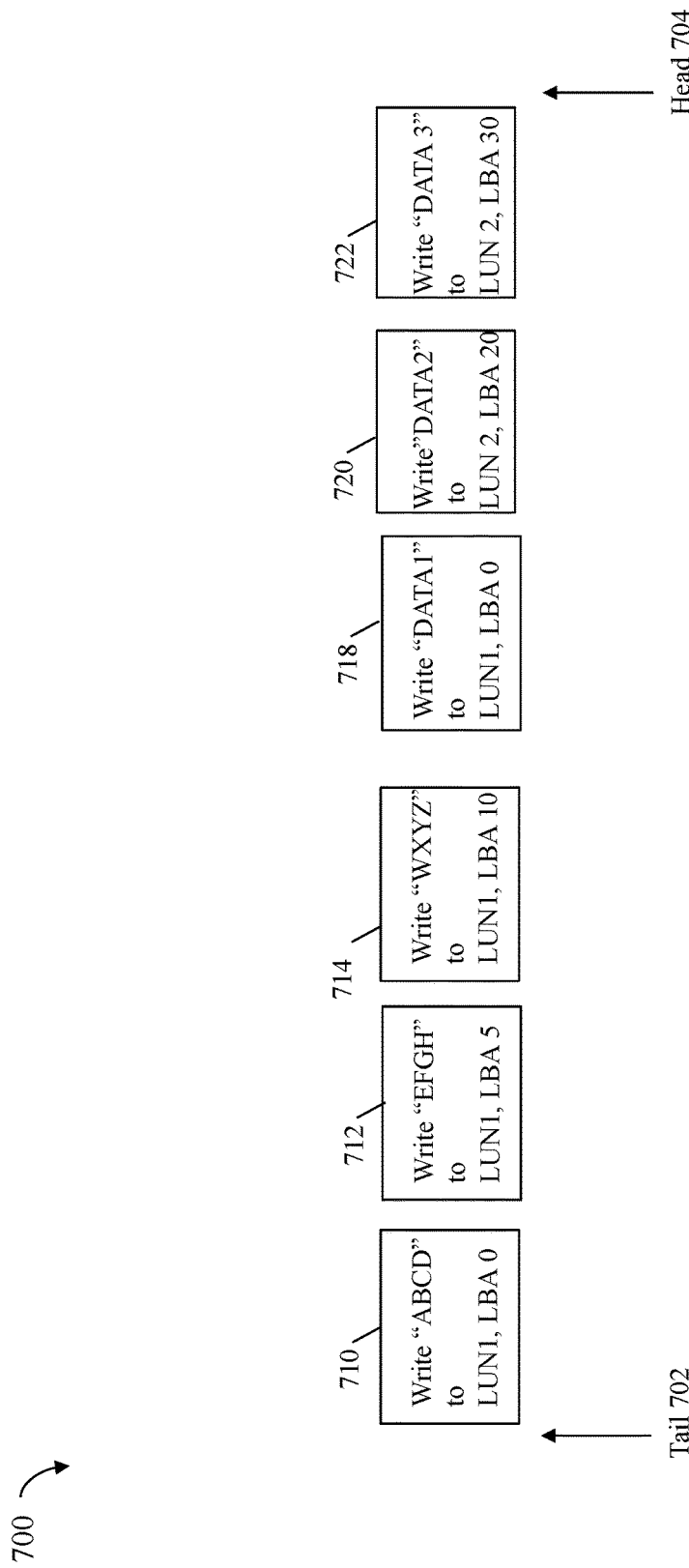

Referring to FIG. 4, shown is an example of information that may be included in a log in an embodiment in accordance with the techniques herein.

The example 700 includes the head pointer 704 and the tail pointer 702. The elements 710, 712, 714, 718, 720 and 722 denote 6 records of the log for 6 write I/O operations recorded in the log. The element 710 is a log record for a write operation that writes "ABCD" to the LUN 1, LBA 0. The element 712 is a log record for a write operation that writes "EFGH" to the LUN 1, LBA 5. The element 714 is a log record for a write operation that writes "WXYZ" to the LUN 1, LBA 10. The element 718 is a log record for a write operation that writes "DATA1" to the LUN 1, LBA 0. The element 720 is a log record for a write operation that writes "DATA2" to the LUN 2, LBA 20. The element 722 is a log record for a write operation that writes "DATA3" to the LUN 2, LBA 30. As illustrated in FIG. 4, the log records 710, 712, 714, 718, 720 and 722 may also record the write data (e.g., write I/O operation payload) written by the write operations. It should be noted that the log records 710, 712 and 714 of FIG. 4 correspond respectively to the log records 221, 222 and 223 of FIG. 3.

The log may be flushed sequentially or in any suitable manner to maintain desired data consistency. In order to maintain data consistency when flushing the log, constraints may be placed on an order in which the records of the log are flushed or logically applied to the stored data while still allowing any desired optimizations. In some embodiments, portions of the log may be flushed in parallel in accordance with any necessary constraints needed in order to maintain data consistency. Such constraints may consider any possible data dependencies between logged writes (e.g., two logged writes that write to the same logical address) and other logged operations in order to ensure write order consistency.

Figure 5:
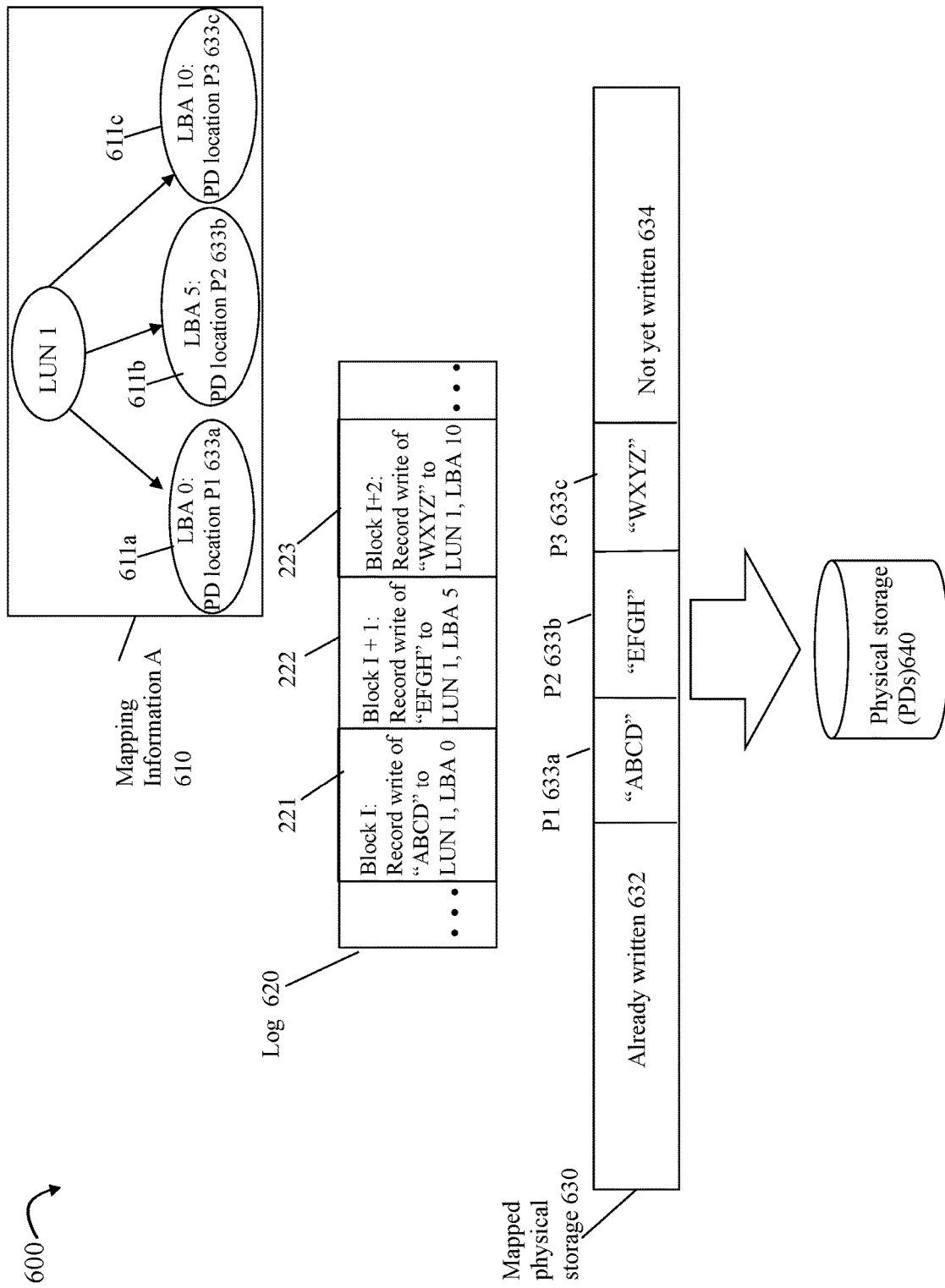

Referring to FIG. 5, shown is an example 600 illustrating the flushing of logged writes and the physical data layout of user data on BE PDs in at least one embodiment in accordance with the techniques herein. FIG. 5 includes the log 620, the mapping information A 610, and the physical storage (i.e., BE PDs) 640. The element 630 represents the physical layout of the user data as stored on the physical storage 640. The element 610 may represent the logical to physical storage mapping information A 610 created for 3 write I/O operations recorded in the log records or blocks 221, 222 and 223.

The mapping information A 610 includes the elements 611a-c denoting the mapping information, respectively, for the 3 target logical address of the 3 recorded write I/O operations in the log records 221, 222, and 223. The element 611a of the mapping information denotes the mapping information for the target logical address LUN1, LBA 0 of the block 221 of the log 620. In particular, the block 221 and mapping information 611a indicate that the user data "ABCD" written to LUN 1, LBA 0 is stored at the physical location (PD location) P1 633a on the physical storage 640. The element 611b of the mapping information denotes the mapping information for the target logical address LUN1, LBA 5 of the block 222 of the log 620. In particular, the block 222 and mapping information 611b indicate that the user data "EFGH" written to LUN 1, LBA 5 is stored at the physical location (PD location) P2 633b on the physical storage 640. The element 611c of the mapping information denotes the mapping information for the target logical address LUN 1, LBA 10 of the block 223 of the log 620. In particular, the block 223 and mapping information 611 indicate that the user data "WXYZ" written to LUN 1, LBA 10 is stored at the physical location (PD location) P3 633c on the physical storage 640.

The mapped physical storage 630 illustrates the sequential contiguous manner in which user data may be stored and written to the physical storage 640 as the log records or blocks are flushed. In this example, the records of the log 620 may be flushed and processing sequentially (e.g., such as described in connection with FIG. 3) and the user data of the logged writes may be sequentially written to the mapped physical storage 630 as the records of the log are sequentially processed. As the user data pages of the logged writes to the target logical addresses are written out to sequential physical locations on the mapped physical storage 630, corresponding mapping information for the target logical addresses may be updated. The user data of the logged writes may be written to mapped physical storage sequentially as follows: 632, 633a, 633b, 633c and 634. The element 632 denotes the physical locations of the user data written and stored on the BE PDs for the log records processed prior to the block or record 221. The element 633a denotes the PD location P1 of the user data "ABCD" stored at LUN 1, LBA 1. The element 633b denotes the PD location P2 of the user data "EFGH" stored at LUN 1, LBA 5. The element 633c denotes the PD location P3 of the user data "WXYZ" stored at LUN 1, LBA 10. The element 634 denotes the physical locations of the user data written and stored on the BE PDs for the log records processed after the block or record 223.

In one aspect, the data layout (e.g., format or structure) of the log-based data of the log 620 as stored on non-volatile storage may also be physically sequential and contiguous where the non-volatile storage used for the log may be viewed logically as one large log having data that is laid out sequentially in the order it is written to the log.

The data layout of the user data as stored on the BE PDs may also be physically sequential and contiguous. As log records of the log 620 are flushed, the user data written by each flushed log record may be stored at the next sequential physical location on the BE PDs. Thus, flushing the log may result in writing user data pages or blocks to sequential consecutive physical locations on the BE PDs. In some embodiments, multiple logged writes may be flushed in parallel as a larger chunk to the next sequential chunk or portion of the mapped physical storage 630.

Figure 6:
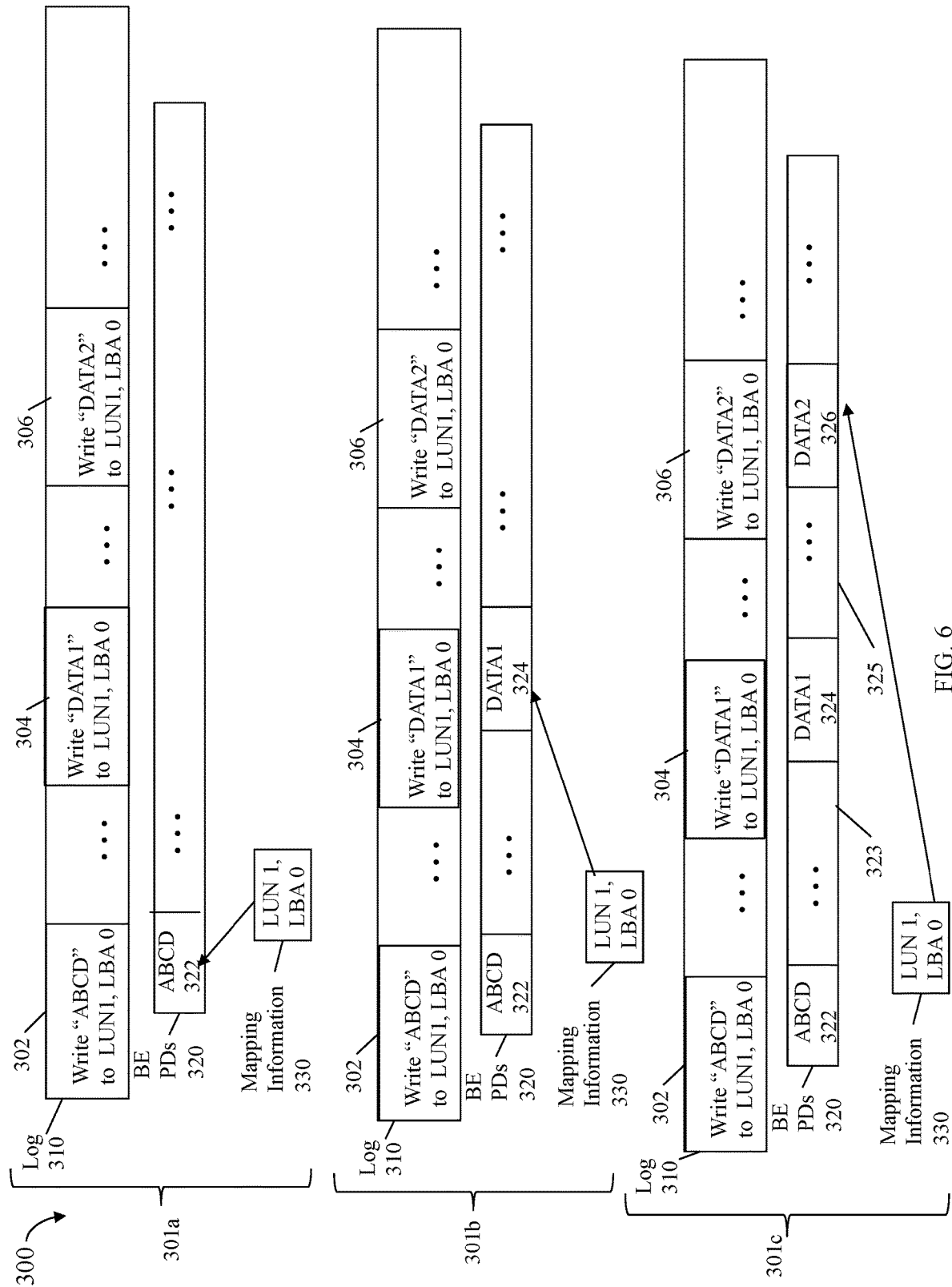

Consistent with other discussion herein, the mapped physical storage 630 may correspond to the BE PDs providing BE non-volatile storage that may be used for persistently storing user data as well as metadata, such as the mapping information. With a log-structured system as discussed herein, as recorded writes in the log are processed, the data written by the writes may be written to new physical storage locations on the BE PDs. For example with reference to FIG. 6, the element 301a may denote the state of the log file 310, BE PDs 320 and mapping information 330 at a first point in time T1 after processing the record 302 for a first write of "ABCD" to the logical address LUN A, LBA 0. The data written "ABCD" by the recorded write of 302 may be stored at the BE PD location 322. Thus, flushing the log record 302 results in storing the write data "ABCD" to the BE PD location 322 and additionally updating the mapping information 330 to reference the BE PD location 322. The mapping information 330 denotes the metadata used to map the logical address LUN 1, LBA 0 to the current physical location on the BE PDs containing the user data or content stored at the logical address LUN 1, LBA 0.

At a second point in time T2 subsequent to T1, the log record 304 may be processed and flushed to the BE PDs 320. The element 301b denotes the state of the log file 310, BE PDs 320 and mapping information 330 at the second point in time T2 after processing the record 304 for a second write of "DATA1" to the logical address LUN A, LBA 0. The data written "DATA1" by the recorded write of 304 may be stored at the BE PD location 324. Thus, flushing the log record 304 results in storing the write data "DATA1" to the BE PD location 324 and additionally updating the mapping information 330 to reference the BE PD location 324 denoting the physical location containing the data stored at the LUN 1, LBA 0 at the time T2. Additionally, the PD location 322 may be invalidated since it no longer contains valid current data for the logical address LUN 1, LBA 0, whereby the PD location 322 may be available for reuse.

At a third point in time T3 subsequent to T2, the log record 306 may be processed and flushed to the BE PDs 320. The element 301c denotes the state of the log file 310, BE PDs 320 and mapping information 330 at the third point in time T3 after processing the record 306 for a third write of "DATA2" to the logical address LUN A, LBA 0. The data written "DATA2" by the recorded write of 306 may be stored at the BE PD location 326. Thus, flushing the log record 306 results in storing the write data "DATA2" to the BE PD location 326 and additionally updating the mapping information 330 to reference the BE PD location 326 denoting the physical location containing the data stored at the LUN 1, LBA 0 at the time T3. Additionally, the PD location 324 may be invalidated since it no longer contains valid current data for the logical address LUN 1, LBA 0, whereby the PD location 324 may be available for reuse.

As illustrated by the elements 301a-c, over time, physical storage locations 322, 324 of the BE PDs 320 become free and available for reuse. Other physical storage locations 323, 325 may still contain valid data. Thus, the free, available reusable physical storage locations 322, 324 may form holes or segments interspersed among other portions 323, 325 containing valid data. More generally, the size of the holes 322, 324 may be of varying sizes and may include multiple user data blocks or pages. Additionally, portions of physical storage of the BE PDs may also be similarly allocated and then freed for reuse for other purposes. Thus, the holes of free, reusable physical storage as well other portions of physical storage including valid data may result not only from flushing the log file but also from other purposes that may vary with embodiment.

Garbage collection may be performed at various times in an embodiment. Garbage collection processing may be performed on the BE PDs to aggregate allocated stored data blocks with valid data to eliminate free unused physical storage locations that may be interspersed between the data blocks containing valid user data. Such aggregation may include physically copying or moving data blocks of valid user data stored at various physical locations on BE non-volatile storage into a single larger physical storage location. After the valid data blocks, such as 323, 325 and 326 at the time T3, are relocated from their source locations, the storage locations 322, 323, 324, 325 and 326 may be denote a larger contiguous chunk of storage that is free and available for reuse. Having such a larger contiguous chunk of free storage facilitates efficiently fulfilling subsequent allocation requests for free BE PD capacity from different components for different uses. Such subsequent allocation requests may include, for example, requests for storing user data that is flushed from the log as well as other requests for larger amounts of storage. For example, free BE PD capacity may be needed to store data copied from a failing or worn out drive, to store data copied off a healthy drive based on a user on-demand request, and other suitable requests that may vary with embodiment.

A specified size or chunk of physical storage of the BE PDs may be referred to as a PLB. Utilization, such as of a single PLB, may be expressed as a percentage or ratio of allocated consumed storage with respect to the total capacity. For example, if 40% of the PLB is allocated and includes valid data and the remaining 60% of the PLB is unused and free, the utilization for the single PLB is 40%. Generally, the lower the per PLB utilization, the more efficient the garbage collection since larger amounts of free capacity are reclaimed and aggregated from PLBs with lower utilization. However, the PLBs used with storing user data, such as written by writes flushed from the log, may generally have higher PLB utilizations making the garbage collection less efficient.

A system may also reserve an amount of free capacity exclusively for one or more uses. For example, a first amount of physical storage may be reserved for use when proactively copying data off of failing or worn out PDs as part of processing to migrate the data to a healthier PD prior to actual failure of the failing or worn out PDs. However, such uses may never occur whereby the reserved capacity remains completely unused.

Thus, in some systems, garbage collection may not be as efficient due to the high utilization of the PLBs storing user data. In contrast, other PLBs of the reserved capacity may have very low or no utilization. However, such reserved capacity may never be subject to garbage collection since it is reserved for potential occurrences of specified events.

Some existing systems may also allocate free capacity from the BE PDs as requested on a first come first served basis without regard to prioritization of the requests and without regard to the state of the system.

Described in the following paragraphs are techniques for managing the free storage capacity of the BE PDs in a more efficient manner. The techniques provide a balanced approach by taking into account a priority associated with a request for free capacity and also taking into account the current state of the system. In at least one embodiment, the techniques may consider whether to grant a request for free storage capacity in accordance with a priority associated with the request and also in accordance with the current level of utilization of the storage capacity of the system. The techniques provide for balancing the needs and requests for free storage capacity among multiple components, or more generally consumers, of the free storage capacity while also considering the particular priorities of the requests and the current utilization of the BE PD storage at the system level. By considering points in time when the utilization of the system wide storage capacity may be greater than a specified threshold level, requests may be granted only when such requests have a higher priority above a specified priority level. In this manner, a lower priority or non-urgent request may not be granted when the current utilization level of the storage capacity is above the specified threshold level.

The techniques herein provide a holistic and cross component approach to balance the various purposes for requesting free capacity, such as free capacity of the BE PDs, while maximizing system efficiency. In at least one embodiment, the capacity needs or purposes of all components may be ranked and assigned a relative priority level. Additionally, each of the needs or purposes and associated relative priority level may be further assigned a utilization level or threshold. The utilization level or threshold may denote a percentage of utilization of the system wide storage capacity. In at least one embodiment, a utilization level or threshold of the BE storage capacity may be expressed as a percentage or ratio of the amount of consumed, utilized BE storage capacity with respect to the total amount of BE storage capacity of the system. For example, the total amount of BE storage capacity across all BE PDs of the system may be 100 GB where 10 GB is used or allocated and 90 GB are free or available. In this case, the current utilization may be expressed as 10%. The techniques provide a well defined set of rules and interface so that free or available capacity of the BE PDs may be distributed across requesting components based on the established priorities and associated utilization levels or thresholds.

The techniques described in the following paragraphs are described with respect to storage capacity of BE PDs providing non-volatile storage in a system. More generally, the techniques herein may be used in connection with any suitable resource requested for any suitable purposes by multiple consumers of the resource.

The foregoing and other aspects of the techniques herein are described in more detail in illustrative examples in the following paragraphs.

In an embodiment in accordance with the techniques herein, the capacity needs or purposes for which free capacity may be requested may be ranked in terms of relative priority.

For example, in at least one embodiment, the following may identify all possible needs or purposes for which free capacity of the BE PDs may be requested in a data storage system. Additionally, a relative priority may also be associated with each need or purposes for requesting free capacity from the BE PDs. In the following paragraphs, priorities may be denoted as an integer value greater than zero. Thus, priority 1 denotes the highest priority with subsequently lower ranked purposes having a higher priority number. In at least one embodiment, there are 7 needs or purposes for which free capacity from the BE PDs may be requested, whereby the 7 purposes are assigned a relative priority from 1-7 and then ranked in terms of their assigned priorities. The priority 1 denotes the highest priority purpose and the priority 7 denotes the lowest priority purpose.

Priority 1. Request free capacity to get out of read only mode and resume processing write I/Os and other requests that may consume BE storage. In at least one embodiment, the data storage system may enter the read only mode where only read I/Os are processed. For example, in read only mode the system may not process or service write I/Os and other requests or commands that may result in consuming free capacity of the BE PDs. The system may enter the read only mode in response to the free or available BE capacity used for storing user data (UD) reaches a minimum threshold level. In at least one embodiment, when the current amount of free or available BE capacity for storing UD reaches the minimum threshold level, the system may no longer have free capacity available to store user data. Thus, the system currently may not currently have sufficient free capacity to persistently store on the BE PDs user data written by recorded writes of the log whereby flushing the recorded writes of the log attempt to store the user data on the BE PDs.

In at least one embodiment, the BE PDs may be configured to store UD such as data written by write I/Os, and also different types of metadata (MD). The MD may include, for example, the mapping information discussed elsewhere herein, as well as other MD used in connection with deduplication, snapshots, and the like. In such an embodiment, the utilization levels may be based on the utilized capacity or BE storage with respect to the aggregated amounts of both UD and MD.

In at least one embodiment, a first portion or pool of the BE PDs used for storing MD may be configured using a first RAID configuration, and a second portion or pool of the BE PDs used for storing UD may be configured using a second different RAID configuration. For example, the first pool of PDs for storing MD (sometimes referred to herein as the MD pool) may be configured as RAID-1 RAID groups; and the second portion of PDs storing UD (sometimes referred to herein as the UD pool) may be configured as RAID-5 or RAID-6 RAID groups. Thus, when allocating requested storage for storing UD, the storage may be allocated from the UD pool or second portion of BE PDs configured for storing UD.

At various points in time, processing may be performed to rebalance the amount of BE PD capacity configured for storing UD and the amount of BE PD capacity configured for storing MD.

In at least one embodiment, the system may enter into the read only mode associated with the priority 1 if there is insufficient free capacity (e.g., below the minimum threshold) in the UD pool. In response, processing may be performed to reconfigure or rebalance the BE PD configuration of the UD pool and the MD pool. Assuming the MD pool has free capacity and the current free capacity of the UD pool is below the minimum threshold triggering the read only mode, processing may be performed to shift free capacity from the MD pool to the UD pool.

For example, consider a first scenario with read only mode as noted above where the UD pool free capacity is below the minimum threshold and has triggered read only mode. However, assume there is free capacity in the MD pool and that a specified amount of free capacity may be shifted from the MD pool to the UD pool without having the remaining MD pool free capacity also falling below a specified minimum threshold. Processing may be performed to reconfigure and rebalance the BE PD portions configured for the UD pool and the MD pool. In this first scenario, assume garbage collection does not result in freeing any more UD pool capacity. In this case, there may be free capacity available in the MD pool. Processing may be performed in accordance with the techniques herein to rebalance and reconfigure the BE PD capacity used for storing the MD and the UD. In this example, processing may be performed to shift some of the free capacity of the MD pool currently configured for storing MD to free capacity of the UD pool configured for storing UD. For example, such shifting and reconfiguration may include reconfiguring some of the free capacity of the BE PDs of the MD pool from RAID-1 used to store MD to RAID 5 or RAID-6 used to store UD. Such reconfigured free capacity may then be included in the UD pool and shifted out of the MD pool.

As another second scenario, in at least one embodiment, the read only mode may be triggered as a result of the MD pool free capacity falling below a minimum threshold. However, assume there is free capacity in the UD pool and that a specified amount of free capacity may be shifted from the UD pool to the MD pool without having the remaining UD pool free capacity also falling below a specified minimum threshold. Processing may be performed to reconfigure and rebalance the BE PD portions configured for the UD pool and the MD pool. In this second scenario, assume garbage collection does not result in freeing any more MD pool capacity. In this case, there may be free capacity available in the UD pool even though there is insufficient free capacity in the MD pool. Processing may be performed in accordance with the techniques herein to rebalance and reconfigure the BE PD capacity used for storing the MD and the UD. In this example with the second scenario, processing may be performed to shift some of the free capacity of the UD pool currently configured for storing UD to free capacity of the MD pool configured for storing MD. For example, such shifting and reconfiguration may include reconfiguring some of the free capacity of the BE PDs of the UD pool currently configured for RAID-5 or RAID-6 used to store UD to RAID-1 used to store MD. Such reconfigured free capacity may then be included in the MD pool and shifted out of the UD pool.

In a third scenario, there may be insufficient free capacity in both the UD pool and the MD pool. For example, both the UD pool and the MD pool have associated free capacities below specified minimum threshold levels. As another example, the third scenario may occur when shifting a specified minimum amount of free capacity from either the UD pool or MD pool results in that pool falling below its associated minimum threshold free capacity level. In connection with this third scenario, the system may notify and prompt the user to take some corrective action to free capacity on the BE PDs. Such actions may result in increasing the free capacity of the UD pool and/or the MD pool.

Thus, in at least one embodiment, the read only mode and associated priority 1 may result due to one or both of the UD pool and the MD pool having free capacity below a specified minimum threshold or level. In such case, the system may perform processing to rebalance and shift free capacity among the UD pool and the MD pool so that both such pools meet any specified free capacity minimum thresholds or levels.

Once the UD pool and the MD pool have sufficient free capacity above any specified minimum thresholds associated with triggering the read only mode, the data storage system may transition out of the read only mode.

Priority 2. Request free capacity to rebuild a failed drive and eliminate a degraded state where stored user data has no redundancy protection. In at least one embodiment, user data may be stored on the BE PDs in any suitable manner providing data protection where the user data is redundantly stored. For example, as noted above the user data may be stored in on the BE PDs in accordance with a specified RAID level, configuration and algorithm. When a priority 2 occurs, any further failure of a RAID group drive member results in the loss of customer or user data. For example, the priority 2 occurs for a RAID-6 configuration with 2 drive member failures, occurs for a RAID-5 configuration with a single drive member failure, and occurs for a RAID-1 configuration with a single drive member failure. When requesting free capacity for a priority 2 request, the free capacity will be used in connection with rebuilding or reconstructing the content of the one or more failed drive members of the RAID group. For example, the free capacity may be used in place of a failed drive in a RAID group. Depending on the particular RAID rebuild algorithm, the free capacity may be used as a temporary location for storing user data or parity constructed as part of the rebuild. Subsequently, data from the temporary location may be copied to another location such as permanent replacement drive for the failed drive of the RAID group.

Priority 3. Request free capacity to rebuild a failed drive and eliminate a degraded state where stored user data still has redundancy protection. In at least one embodiment, user data may be stored on the BE PDs in any suitable manner providing data protection where the user data is redundantly stored. For example, as noted above the user data may be stored in on the BE PDs in accordance with a specified RAID level, configuration and algorithm. When a priority 3 occurs, a RAID group drive member has failed but the user data of the RAID group still has redundancy protection. For example, the priority 3 occurs for a RAID-6 configuration with 1 drive member failure whereby data of the RAID-6 group still has redundancy. When requesting free capacity for a priority 3 request, the free capacity will be used in connection with rebuilding or reconstructing the content of the failed drive member of the RAID group. For example, the free capacity may be used in place of a failed drive in a RAID group. Depending on the particular RAID rebuild algorithm, the free capacity may be used as a temporary location for storing user data or parity constructed as part of the rebuild. Subsequently, data from the temporary location may be copied to another location such as permanent replacement drive for the failed drive of the RAID group.

Priority 4. Request free capacity to replenish a hot spare drive. When configuring BE storage, one or more extra or spare PDs may be provided. The spare PDs may be used in the event of a PD failure whereby the spare replaces the failed PD. Once the spare PD is used to replace a failed PD, the hot spare PD needs to be replenished by providing a new designated spare PD. For example, consider a BE PD configuration which has a single spare for each RAID-5 RAID group configured for storing user data. Now a single PD failure occurs for the RAID-5 group and the hot spare is used to replace the single failed PD. The RAID-5 group may provide for rebuilding the data stored on the failed PD and using the hot spare as a replacement for the failed PD of the RAID-5 group. However, now a priority 4 request may be issued for a new hot spare PD having a specified capacity for use with the RAID-5 RAID group. Thus, the priority 4 request may be a request to obtain a new hot spare device, such as for the RAID-5 RAID group, that has used its spare device to replaced a failed RAID group drive member. The priority 4 request may be a request to obtain a new hot spare of the specified capacity from the pool of free BE PDs.

The particular number of extra or spare PDs maintained for one or more RAID groups may vary with the BE configuration and policy in an embodiment. For example, as discussed elsewhere herein, in at least one embodiment the BE PDs may be configured in traditional RAID groups and configurations where a hot spare (or more generally spare) PD may exist for each configured RAID group. As a variation as discussed in more detail below, the BE PDs may be alternatively configured using mapped RAID where there is no dedicated spare device(s).

In at least one embodiment, the BE PDs may be configured into traditional RAID groups having one or more specified RAID levels and configurations. For example, as discussed elsewhere herein, in at least one embodiment, a portion of the BE PDs used for storing metadata may be configured using a RAID-1 configuration and another portion of the BE PDs used for storing user data may be configured using a RAID-5 or RAID-6 configuration. In such traditional RAID group configurations, a single hot spare PD may be configured for each RAID group. The hot spare PD may be used to replace a failed PD of the RAID group. The data of the failed PD may be rebuilt using the other PD members of the RAID group, where the data of the failed PD may be stored on the spare PD. The spare PD may then be used in the RAID group in place of the failed PD.

An embodiment in accordance with the techniques herein may configure the BE PDs using one or more mapped RAID configurations. A mapped RAID configuration uses the concept of a resiliency set (RS). A RS may be defined as a logical grouping of PDs forming a fault or failure domain. Stripes of data and parity information may be distributed across the PDs of the RS. Generally, data of a single failed PD in a RS may be recovered or rebuilt using data from one or more other healthy functioning PDs of the same RS.

With mapped RAID configurations, a desired RAID level and configuration may be selected. For example, a RAID-5 level consisting of 4 data drives and 1 parity drive may be selected. With traditional RAID-5, a stripe may be defined as including 4 disk extents of user data and 1 disk extent of parity information where each of the foregoing 5 disk extents are distributed across all 5 PDs of the RAID group. With mapped RAID, each stripe of user data and parity information is also distributed across a number of PDs. However, the number of PDs is not limited to 5. Rather with mapped RAID, the traditional RAID group stripes of user data and parity information are generally distributed across a set of N drives forming the RS, where min<N< max, min and max are specified integer values, and min is greater than M denoting the number of PDs in the traditional RAID group configuration. For example, when configuring mapped RAID with RAID-5, min may be greater than 5. In at least one embodiment, max may be selected and limited in size to achieve a desired level of reliability. For example, in at least one embodiment, max may be 26 whereby 25 may be the maximum allowable number of PDs in a RS or fault domain of a mapped RAID configuration. If additional PDs are added to a RS so that the total exceeds 25, the PDs of the RS may be partitioned into multiple RSs so as to conform to the specified min and max size values.

With a mapped RAID configuration using a RS, there is no dedicated spare device or devices allocated for use with the RS. Rather, with mapped RAID, a portion of each PD of the RS of the fault domain may be reserved and used as distributed spare capacity across all PDs of the RS.

Figure 7:
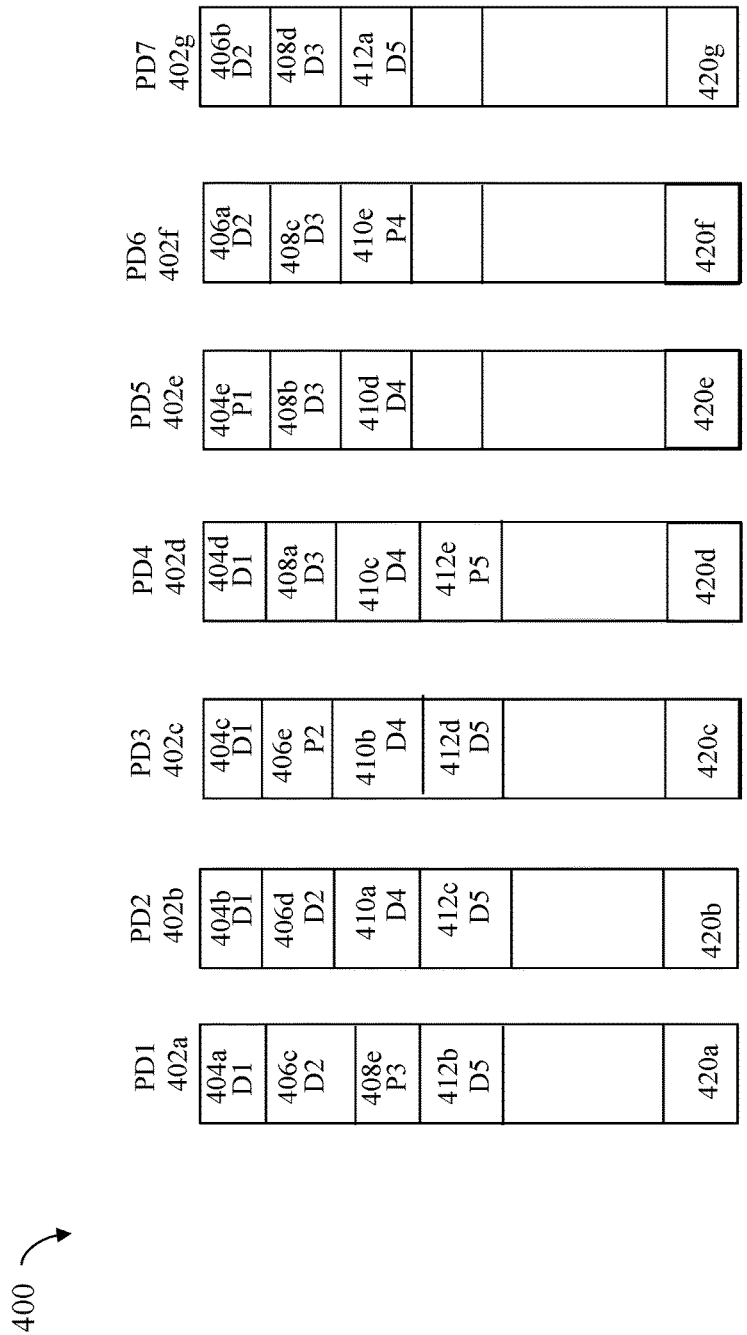
FIG. 7 is an example illustrating mapped RAID in an embodiment in accordance with the techniques herein.

To further illustrate, reference is made to FIG. 7. The example 400 illustrates a mapped RAID configuration for RAID-5 using a RS of 7 PDs 402a-g. Consistent with other discussion herein, each RAID-5 stripe may include 4 disk extents of user data and 1 disk extent of parity information. The first RAID-5 stripe of the mapped RAID configuration may include 4 disk extents 404a-d and a parity extent 404e. The second RAID-5 stripe of the mapped RAID configuration may include 4 disk extents 406a-d and a parity extent 406e. The third RAID-5 stripe of the mapped RAID configuration may include 4 disk extents 408a-d and a parity extent 408e. The fourth RAID-5 stripe of the mapped RAID configuration may include 4 disk extents 410a-d and a parity extent 410e. The fifth RAID-5 stripe of the mapped RAID configuration may include 4 disk extents 412a-d and a parity extent 412e. The portions 420a-g denote the reserved capacity of the PDs of the RS comprising the distributed spare capacity across the PD 402a-g. In the event of a failure of a PD, such as PD 402a, the data extents and parity information stored on the failed PD 402a may be rebuilt using the data and parity information from the other PDs 402b-g of the RS based on the RAID-5 rebuild algorithm. The rebuilt data extents and parity information of the PD 402a may be stored on any suitable ones of the spare capacity portions 420b-g of the remaining healthy PDs 402b-g.

Embodiments of mapped RAID and the concept of a fault or failure domain are further described, for example, in U.S. Pat. No. 10,310,752, Issued Jun. 4, 2019, entitled "Extent Selection with Mapped RAID" to Li et al., which is incorporated by reference herein in its entirety; and in U.S. Pat. No. 10,521,145, Issued Dec. 31, 2019, entitled "Method, Apparatus and Computer Program Product for Managing Data Storage" to Foley et al, which is incorporated by reference herein in its entirety.

Thus, in at least one embodiment using mapped RAID, a priority 4 request may be a request to replenish storage used as spare capacity. The spare capacity may be distributed across the PDs of the fault or failure domain and RS.

Priority 5. Request free capacity for use in copying data from a failing PD. A PD may have an associated state of "failing" but has not yet actually failed. A PD may be characterized as failing, for example, based on the number, type and/or severity of errors received when performing I/Os (e.g., reads and/or writes) to the PD. Based on specified failing criteria, a PD meeting such criteria may be characterized as failing and thus expected to imminently fail. When such a state of a failing PD is detected, processing may be performed to proactively copy data from the failing PD prior to the PD failing whereby the data can no longer be read from or written to the PD. As part of the proactive copying of data from the failing PD, a priority 5 request may be made for free capacity to use as a target location where data is copied off of the filing PD to the target location.

Priority 6. Request free capacity for use in copying data from a worn out PD. Certain types of PDs, such as flash drives, have a number, E, of expected writes or erasures that can be done before the flash drive is expected to fail. At a point in time N, W(N) may denote the number of writes or erasures that have been performed for the flash drive. Thus, the PD may be characterized as worn out if a ratio of $W(N)/E$ is greater than a specified threshold percentage, such as 90%. In this case, if the ratio is greater than the threshold percentage, the PD may be characterized as worn out and a priority 6 request may be made to obtain free capacity from the BE storage to be used as a target location. In particular, the requested free capacity will be used as the target location where data is proactively copied from the worn out PD to the target location.

More generally, the concept of a worn out PD may also be applied to other drive types and technologies such as based on when a PD is expected to reach its estimated end of life (EOL). The EOL may be based on any suitable criteria that may vary with the particular technology of the PD. The EOL may be based on one or more criteria including age of the drive and its components and utilization of the drive. For example, a PD that is a rotating hard disk drive may have an EOL based on the age and utilization of the mechanical components of the PD. In this example, the requested free capacity will be used as the target location where data is proactively copied from the worn out PD to the target location prior to the estimated EOL of the PD. The priority 6 request with respect to a PD may be made, for example, if the current age and/or utilization of the PD is within some specified threshold level(s) based on the EOL. For example, a PD may be deployed in a data storage system for a current amount of time X, where X may be expressed in any suitable time units such as days, hours, and the like. The PD may be expected to have an EOL of Y expressed in any suitable time units such as days, hours, and the like. When X/Y reaches a specified threshold level, the PD may be characterized as worn out or approaching its EOL thereby triggering a priority 6 request for free capacity to be used as a target location for data copied off of the worn out PD.

Priority 7. Request free capacity for use in copying data from a healthy PD in response to a user request. A user may request to remove a healthy PD from the BE configuration. In response to the user request, existing data on the healthy PD needs to be copied to another target location on the BE PDs. In response to the user request, processing may be performed to issue a priority 7 request for free capacity used as the target location to store the data copied from the healthy PD to be removed by the user.

It should be noted that the user request to remove a healthy PD from the BE PD configuration of data storage system may be made for any reason or purpose. For example, a user may be relocating one or more healthy PDs from one data storage system to another data storage system.

Once the list of free capacity purposes or needs is compiled where each such purpose or need is assigned a priority as described above, each prioritized purpose or need (other than priority 1 above) is also associated with a utilization threshold. In at least one embodiment, the utilization thresholds and also current utilization measurements associated with the prioritized free capacity purposes may be system level with respect to all the BE PDs in the data storage system. For example, consider an embodiment having BE PD storage configured for use with both a UD pool and a MD pool as discussed elsewhere herein. In this case, the utilization thresholds as well as current utilization measurements discussed below may be with respect to all the BE PDs of both the UD pool and the MD pool.

In such an embodiment, a request for free capacity has an associated priority, where the associated priority has an associated utilization threshold. The request is granted only when the current utilization of the BE PDs is below the specified utilization threshold of the associated priority. Additionally, in at least one embodiment, the request for free capacity may specify an amount or quantity of free capacity. In order to grant the request, the amount or quantity of free capacity requested also needs to be available.

Referring to FIG. 8, shown is an example 500 of information that may be included in a table for use in connection with the techniques herein. The table 500 includes the following 3 columns of information: priority 502, purpose of free capacity 504, and utilization threshold 506. Each row of the table denotes a set of information associated with one of the purposes of uses for which free capacity may be requested. In this example, the table 500 includes 7 rows corresponding to the 7 priorities and purposes for which free capacity may be requested as discussed above. The particular utilization thresholds in the column 506 are provided for illustrative purposes. More generally any suitable thresholds may be used in an embodiment.

The row 510 denotes the information associated with a priority 1 request (column 502) for free capacity to get out of read only mode (column 504). The priority 1 request does not have an associated utilization threshold since a priority 1 request is granted to rebalance and reconfigure the free capacity of the BE PD configuration between the UD pool and the MD pool.

The row 512 denotes the information associated with a priority 2 request (column 502) for free capacity to rebuild a failed PD where the user data stored on the failed PD does not have any redundancy protection (column 504). The priority 2 request has an associated utilization threshold of 80% indicating that any priority 2 request is granted only if the current BE PD utilization is less than 80%.

The row 514 denotes the information associated with a priority 3 request (column 502) for free capacity to rebuild a failed PD where the user data stored on the failed PD has redundancy protection (column 504). The priority 3 request has an associated utilization threshold of 70% indicating that any priority 3 request is granted only if the current BE PD utilization is less than 70%.

The row 516 denotes the information associated with a priority 4 request (column 502) for free capacity to replenish an exhausted hot spare (column 504). The priority 4 request has an associated utilization threshold of 60% indicating that any priority 4 request is granted only if the current BE PD utilization is less than 60%.

The row 518 denotes the information associated with a priority 5 request (column 502) for free capacity to proactively copy data off of a failing PD (column 504). The priority 5 request has an associated utilization threshold of 50% indicating that any priority 5 request is granted only if the current BE PD utilization is less than 50%.

The row 520 denotes the information associated with a priority 6 request (column 502) for free capacity to proactively copy data off of a worn out PD (column 504). The priority 6 request has an associated utilization threshold of 40% indicating that any priority 6 request is granted only if the current BE PD utilization is less than 40%.

The row 522 denotes the information associated with a priority 7 request (column 502) for free capacity to copy data off of a healthy PD as requested by a user (column 504). The priority 7 request has an associated utilization threshold of 30% indicating that any priority 7 request is granted only if the current BE PD utilization is less than 30%.

In at least one embodiment, a first component referred to herein as the mapper component or simply mapper may manage the log structured system. The mapper may, for example control flushing of the log such as deciding when to flush the log, where to store the flushed user data written (e.g., what physical storage location on the BE PDs are used to store user data that is written by a recorded write operation flushed from the log). The mapper may, for example, control garbage collection such as when to perform garbage collection of the BE PDs.

In such an embodiment with mapper, a second component referred to herein as the BE storage manager (BEM) may generally manage the storage capacity of the BE PDs. For example, the BEM knows the state of the various BE PDs and the purposes of the free capacity requests. The BEM knows which one or more PDs have failed, are failing, and/or are worn out. The BEM, for example, knows whether user data has redundancy. For example, the BEM knows whether user data is stored in a RAID1 group that has a failed PD whereby the user data has no redundancy. The BEM knows whether user data is stored in a RAID-6 group whereby the user data has no redundancy if 2 drive member failures of the RAID-6 group occur simultaneously. In this case with 2 drive member failures, the RAID-6 group can still function and service I/Os however user data in the RAID-6 group has no data redundancy.

In the following paragraphs, different tasks are described in connection with an interface between the two components—the mapper and the BEM—for purposes of illustration. More generally, any suitable components may be used in an embodiment in accordance with the techniques herein.

In at least one embodiment, when the data storage system is initialized and booted, the BEM may reserve an amount of free capacity for use in connection with spares or hot spares. For example, in one embodiment using traditional RAID groups, one PD may be reserved from the BE PDs for use per RAID group, where the one PD may function as the hot spare for use with the RAID group. As another example in an embodiment using mapped RAID, a specified or predetermined amount of storage capacity may be reserved for use as distributed spare capacity for each RS or fault domain. For example, the amount of storage capacity may be equal to the capacity of a single PD in the RS or fault domain where such storage capacity is distributed across the PDs of the RS or fault domain.

Other than reserving the necessary spare capacity requirements, all remaining BE PD capacity may be provided by the BEM to the mapper. The mapper may control the free capacity distribution from the BE PDs. If the BEM needs free capacity for one or more purposes, the BEM sends a request to the mapper. The request may identify the purpose or relative priority of the reason for the free capacity request. The priority may be one of the predetermined priorities used to rank the predetermined possible reasons or purposes for requesting free capacity. For example, as discussed above and in connection with FIG. 8, the priority may be one of 7 priorities (from the column 502) depending on the purposes for the requested free capacity (column 504). Additionally, the request may also identify the amount of free capacity requested for the particular priority.

In at least one embodiment, the BEM may denote one or more priorities for which free capacity is requested using a bitmap or bit vector. For example, the bitmap or vector may include a different entry uniquely associated with each of the possible priorities, where if the entry associated with a particular priority is set or equal to 1, the request is requesting free capacity of that priority level. Otherwise, if the entry associated with a particular priority is not set or equal to 0, the request is not requesting free capacity of that priority level. For example, based on the table of FIG. 8, a bit vector B including 7 entries may be used, where the B has an associated integer index n ranging from 1 to 7, inclusively, where B[n]=1 if the request is requesting free capacity for priority "n" and its associated purpose. In this manner, the single but vector may denote whether the single request is requesting free capacity for one or more priorities and associated purposes. In such an embodiment, another vector or array of values may be used to specify the amounts of requested free capacity of the different priorities. For example, based on the table of FIG. 8, a vector C including 7 entries may be used, where the C has an associated integer index m ranging from 1 to 7, inclusively, where C[m] specifies the quantity or amount of free capacity requested for priority "m" and its associated purpose. It should be noted that for an integer "i" denoting one of the valid priorities, the entry C[i] may only be considered as valid if the bit vector [i] is set or equal to 1.

The mapper component may receive the request for free capacity from the BEM and perform processing to determine whether to grant or reject the one or more priority requests for free capacity. In at least one embodiment, the mapper component may use the information in the table 500 to determine whether to grant each request and associated priority based on the current utilization of the BE PDs as compared to the utilization threshold of the associated priority.

To further illustrate, assume the BEM needs free capacity from the BE PDs for 2 purposes having priority 2 and priority 5 as discussed herein and illustrated in the table of FIG. 8. In this case, the BEM sends a bit map or vector with a bit set for priorities 2 and 5. The mapper receives the bit vector and examines the current utilization. Assume, for example, the current utilization is 60%. In this case, the mapper grant the priority 2 request based on the row 512 since the current utilization of 60% is less than the utilization threshold of 80% specified in the row 512 for priority 2 requests. However, the mapper does not grant the priority 5 request based on the row 518 since the current utilization of 60% is higher than the specified utilization threshold of 50% specified in the row 518 for priority 5 requests. In this manner, based on the priorities of 2 and 5 and the current utilization, the higher priority 2 request is granted but not the lower priority or less urgent priority 5 request.

In response, the mapper may return free capacity granted back to the BEM and indicate the particular purpose or priority for which the free capacity is granted. For example, continuing with the above request, the mapper returns free capacity requested for the priority 2 request but not the priority 5 request to the BEM.

At this point any ungranted or rejected priority request may be reissued periodically from the BEM to the mapper since the conditions of the system dynamically change over time. As such the current utilization of the BE PDs may subsequently fall to a low enough level below 50% so that the priority 5 request is granted. For example, the BEM may periodically continue to reissue the request with priority 5. At some later point in time, the current utilization falls to 30%. For example, a user may delete LUNs or perform other cleanup operations that result in freeing a large amount of storage on the BE PDs. As a result the current utilization of the BE PDs falls to 30%. At this point, the mapper grants the priority 5 request for free capacity from the BE PDs since the current utilization of 30% is less than the threshold of 50% associated with priority 5 request.

Consider another example where the priority of a request may increase over time. For example, at a time T11, the BEM may issue a request to the mapper with a priority 3 request for free capacity to use in rebuilding a failed drive. In this example assume the failed drive is drive member of a RAID-6 RAID group. Assume that this failed drive is a single drive failure for the RAID-6 group so there is still 1 level of data redundancy for user data stored on PDs of the RAID-6 group. As known in the art, RAID-6 configurations can tolerate up to 2 simultaneous drive member failures and still service I/Os. However, with 2 drive member failures there is no data redundancy of data in the RAID-6 group. Assume the current utilization level at the time T11 is 75%. So at this point in time T11, the priority 3 request is not granted since the current utilization of 75% is not less than the specified threshold of 70% (as denoted by the row 514 of the table of FIG. 8). At a later point in time T12, assume the same RAID-6 group experiences a failure of a second drive member. At the time T12, the RAID-6 group now has 2 drive member failures and therefore no data redundancy of data in the RAID-6 group. At the time T12, the request priority increases from 3 to 2. In this case, the current utilization of 75% is now less than the revised threshold of 80% associated with the priority 2 request (as denoted by the row 512 of the table of FIG. 8). At this point the mapper grants the request for free capacity from the BE PDs for the priority 2 request.

In connection with the table 500 of FIG. 8, it should be noted that the priority 1 request with information denoted by the row 510 originates with the mapper rather than the BEM. In such an embodiment, requests with priority 2-7 originate with the BEM and are made as discussed above by the BEM requesting the free capacity from the mapper.

In connection with the priority 1 request when the mapper is reconfiguring its MD and UD, any capacity that is freed may be designated for use by the mapper only and may not be used in granting any pending requested from the BEM. In other words, while the mapper is performing processing to service the priority 1 request, any capacity that may be freed temporarily from either the MD pool or the UD pool and then shifted as free capacity to the other pool is not used in connection with granting another request of priority 2-6 from the BEM. Subsequent BEM requests are considered and may be granted after the mapper has completed priority 1 processing that includes shifting free capacity between the MD pool and UD pool.

In at least one embodiment, a request for free capacity with any priority from 2-7 may be granted using free capacity from the UD pool. As a variation in at least one embodiment, a request for free capacity with any priority from 2-7 may also be satisfied or granted by allocating capacity from either the MD pool or the UD pool. In this latter case and variation, the overall system utilization may be obtained based on a combination of a first utilization with respect to the MD pool and a second utilization with respect to the UD pool. The request may be granted by allocating free capacity from the pool having the lower utilization. For example, overall utilization may be 70% where the UD pool has a current utilization of 75% and the MD pool has a current utilization of 60%. In this case, a priority 2 request may be granted using free capacity from the MD pool thereby effectively shifting the capacity granted with the priority 2 request from the MD pool to the UD pool. In such an embodiment, the UD portion and MD portion may be configured to have the same RAID level or protection.

As yet another variation, an embodiment may grant the request having an associated priority level from 2-7 using a combination of free capacity from both the MD pool and the UD pool depending on the utilization levels of the MD pool and the UD pool. For example, if the first utilization of the MD pool and the second utilization of the UD pool are approximately the same (e.g., within some specified tolerance or threshold level of difference), then a request having an associated priority level from 2-7 may be granted using free capacity from both the MD pool and the UD pool. Otherwise, the request may be granted using one of the MD pool and the UD pool having the lowest utilization.

Figure 9:
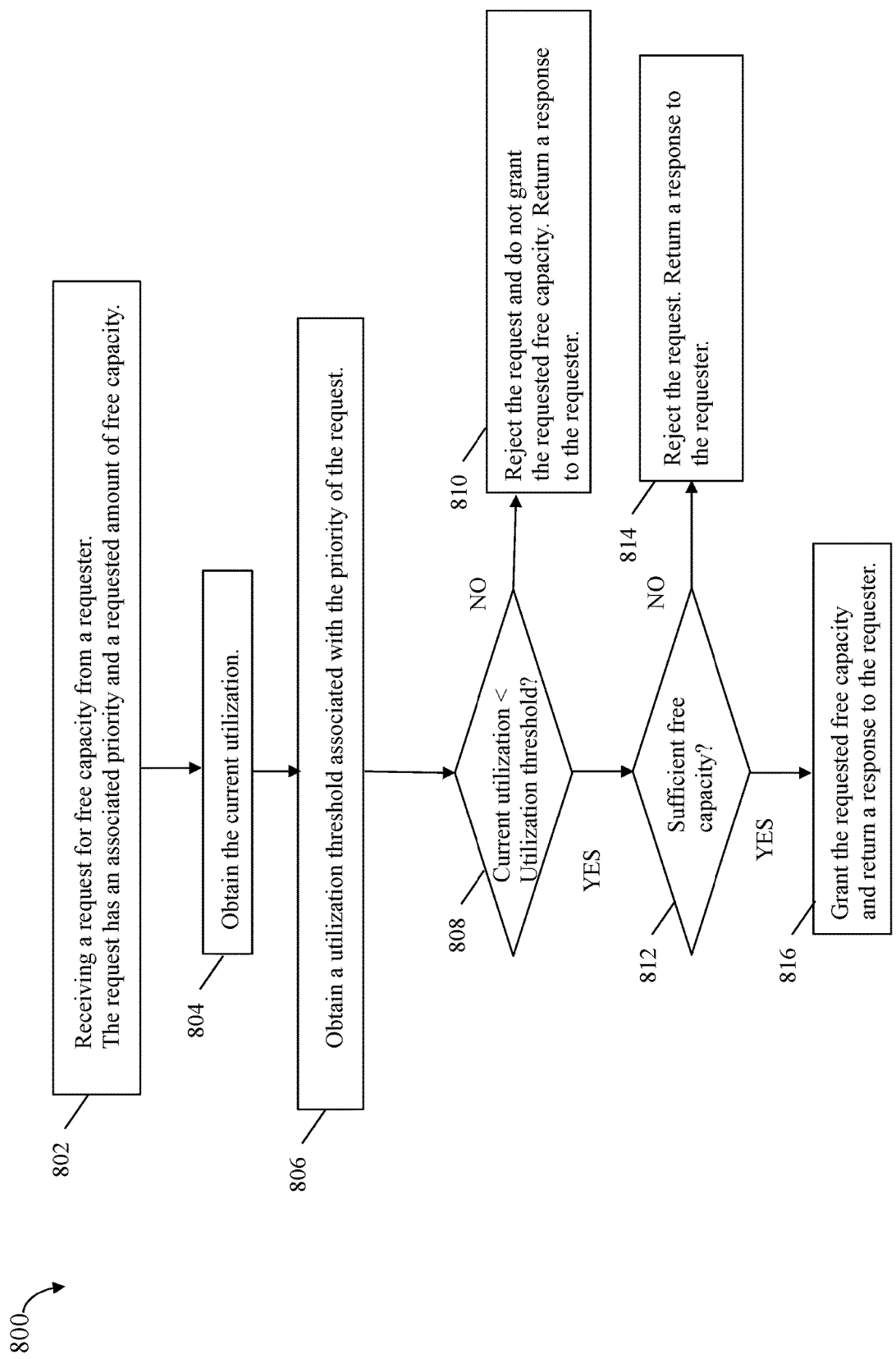
FIGS. 9 and 10 are flowcharts of processing steps that may be performed in an embodiment in accordance with the techniques herein.
Figure 10:
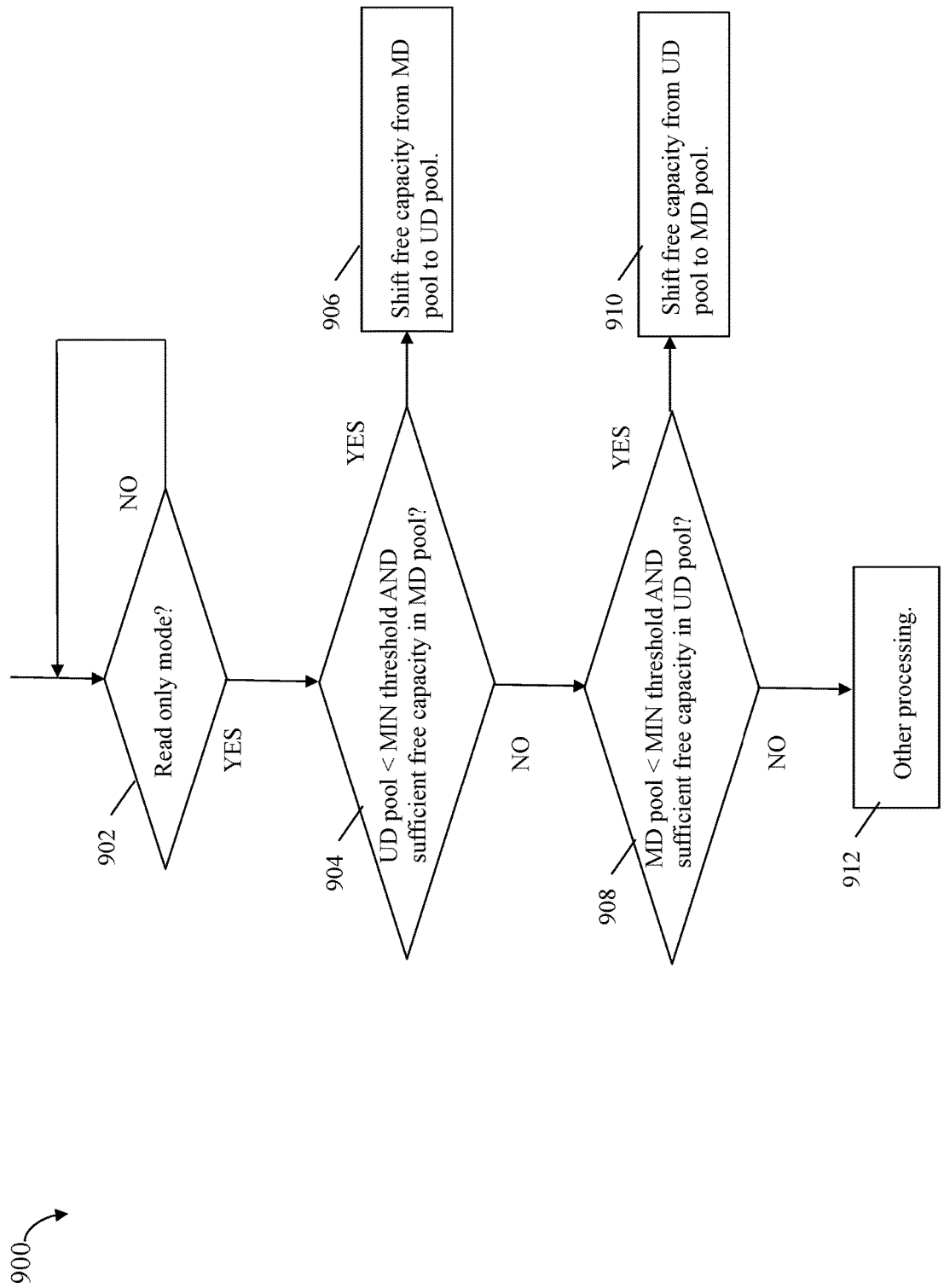

What will now be described in connection with FIGS. 9 and 10 are flowcharts of processing steps that may be performed in an embodiment in accordance with the techniques herein. The processing of FIGS. 9 and 10 summarize processing described above.

Referring to FIG. 9, shown is a first flowchart 800 of processing steps that may be performed in an embodiment in accordance with the techniques herein.

The flowchart 800 processing may be performed in connection with requests having an associated priority in the range of 2-7 discussed above. The flowchart 800 summarizes processing performed, for example, by the mapper component in response to receiving a request for free capacity from the BEM as discussed above.

At a step 802, a request is received from a requester where the request is requesting free capacity from the BE PDs. The request has an associated priority and a requested amount of free capacity. The request may include the associated priority and the request amount of free capacity. From the step 802, control proceeds to the step 804.

At the step 804, the current utilization of the BE PDs is obtained. From the step 804, control proceeds to a step 806.

At the step 806, a utilization threshold associated with the priority of the request is obtained. The utilization threshold may be obtained, for example, from a table of information as discussed in connection with FIG. 8 based on the priority of the request received in the step 802. From the step 806, control proceeds to a step 808.

At the step 808, a determination is made as to whether the current utilization is less than the utilization threshold associated with the request's priority. If the step 808 evaluates to no, control proceeds to a step 810. At the step 810, processing is performed to reject the request and not grant the requested free capacity. A response is returned to the requester indicating that the requested free capacity has not been granted. The requester may reissue the request at a later point in time.

If the step 808 evaluates to yes, control proceeds to a step 812. At the step 812, a determination is made as to whether there is sufficient free capacity to grant the request. For example, the request may request an amount of free capacity and there may be an insufficient amount of free capacity in the BE PDs at the current time to grant the request. If the step 812 evaluates to no, control proceeds to the step 814. At the step 814, processing is performed to reject the request. A response is returned to the requester indicating that the requested free capacity has not been granted. The requester may reissue the request at a later point in time.

If the step 812 evaluates to yes, control proceeds to the step 816. At the step 816, processing is performed to grant the requested free capacity and return a response to the requester.

It should be noted that the processing of FIG. 9 is described with respect to only a single priority included in the request. As discussed elsewhere herein, multiple free capacity requests having multiple priorities may be included in a single call or request.

Referring to FIG. 10, shown is a second flowchart 900 of processing steps that may be performed in an embodiment in accordance with the techniques herein.

The flowchart 900 processing may be performed in connection with requests having an associated priority 1 as discussed above. The flowchart 900 summarizes processing performed, for example, by the mapper component.

At a step 902, a determination is made as to whether the system is in read only mode. Control remains in the step 902 until it evaluates to yes. In response to the step 902 evaluating to yes, control proceeds to a step 904.

At the step 904, a determination is made as to whether the UD pool is below a minimum (MIN) threshold and whether there is sufficient free capacity in the MD pool to shift a portion of the MD pool's free capacity to the UD pool. For example to illustrate determining whether there is sufficient free capacity in the MD pool in the step 904, an embodiment may specify a minimum amount of free capacity to be shifted from the MD pool to the UD pool. In this case, the MD pool needs to have at least this minimum amount of free capacity. Additionally, after the minimum amount of free capacity is shifted from the MD pool to the UD pool, the MD pool needs to have a remaining amount of free capacity that is above another specified minimum. If the step 904 evaluates to yes, control proceeds to the step 906 to shift at least the minimum amount of free capacity from the MD pool to the UD pool. Once the free capacity has been shifted to the UD pool (e.g., whereby the free capacity of the UD pool is above the MIN threshold that triggered the read only mode), the system may transition out of read only mode and service other operations besides read operations. Otherwise if the step 904 evaluates to no, control proceeds to a step 908.

At the step 908, a determination is made as to whether the MD pool is below a minimum (MIN) threshold and whether there is sufficient free capacity in the UD pool to shift a portion of the UD pool's free capacity to the MD pool. For example to illustrate determining whether there is sufficient free capacity in the UD pool in the step 908, an embodiment may specify a minimum amount of free capacity to be shifted from the UD pool to the MD pool. In this case, the UD pool needs to have at least this minimum amount of free capacity. Additionally, after the minimum amount of free capacity is shifted from the UD pool to the MD pool, the UD pool needs to have a remaining amount of free capacity that is above another specified minimum. If the step 908 evaluates to yes, control proceeds to the step 910 to shift at least the minimum amount of free capacity from the UD pool to the MD pool. Once the free capacity has been shifted to the MD pool (e.g., whereby the free capacity of the MD pool is above the MIN threshold that triggered the read only mode), the system may transition out of the read only mode and service other operations besides read operations. Otherwise if the step 908 evaluates to no, control proceeds to a step 912 where other processing is performed. If processing reaches the step 912, it means that there is insufficient available free capacity in both the UD pool and the MD pool and an additional action needs to be taken. For example, the user may be prompted in the step 912 to increase BE PD capacity by adding additional PDs, and/or perform operations to free BE PD capacity (e.g., remove LUNs, delete data from LUNs, delete snapshots, and the like). Generally, the step 912 may include any suitable action that may vary with embodiment, The techniques herein may be performed by any suitable hardware and/or software. For example, techniques herein may be performed by executing code which is stored on any one or more different forms of computer-readable media, where the code may be executed by one or more processors, for example, such as processors of a computer or other system, an ASIC (application specific integrated circuit), and the like. Computer-readable media may include different forms of volatile (e.g., RAM) and non-volatile (e.g., ROM, flash memory, magnetic or optical disks, or tape) storage which may be removable or non-removable.

While the invention has been disclosed in connection with embodiments shown and described in detail, their modifications and improvements thereon will become readily apparent to those skilled in the art. Accordingly, the spirit and scope of the present invention should be limited only by the following claims.

What is claimed is:

1. A method of managing storage comprising:
receiving a request for a first amount of free capacity, wherein the request includes a first priority denoting a purpose for which the first amount of free capacity is requested, wherein the request is requesting the first amount of free capacity from non-volatile physical storage devices;
determining whether a current utilization of storage of the non-volatile physical storage devices exceed; a first threshold associated with the first priority;
responsive to determining the current utilization of storage of the non-volatile physical storage devices less than the first threshold associated with the first priority, performing first processing including:
determining whether there is a sufficient amount of existing free capacity in the non-volatile physical storage devices to grant the first amount; and
responsive to determining there is a sufficient amount of existing free capacity in the non-volatile physical storage devices to grant the first amount, granting the first amount of free capacity of the non-volatile physical storage devices;
responsive to determining the current utilization of storage of the non-volatile physical storage devices not less than the first threshold associated with the first priority, rejecting the request and not granting the first amount of free capacity;
wherein the non-volatile physical storage devices include a first portion configured as a user data pool for storing user data and a second portion configured as a metadata pool for storing metadata;
determining that the data storage system is in a read only mode;
determining that the metadata pool has a first current amount of free capacity below a specified threshold
responsive to determining that the metadata pool has the first current amount of free capacity below the specified threshold, shifting free capacity from the user data pool to the metadata pool to increase free capacity of the metadata pool; and
in response to increasing free capacity of the metadata pool, transitioning the data storage system out of read only mode so that the data storage system is able to service write requests.

2. The method of claim 1, wherein the non-volatile physical storage devices provide backend storage in a data storage system.

3. The method of claim 2, wherein the current utilization denotes a percentage regarding an amount of the physical storage of the non-volatile physical storage devices of the data storage system that is used or allocated.

4. The method of claim 3, wherein the first threshold is one of a plurality of predetermined thresholds associated with a plurality of predetermined purposes or reasons for requesting free capacity, and wherein each of the plurality of predetermined thresholds is associated with a different one of a plurality of priorities, and wherein the plurality of priorities includes the first priority of the request.

5. The method of claim 4, wherein the first threshold denotes a utilization threshold that is threshold percentage regarding an amount of the physical storage of the non-volatile physical storage devices of the data storage system that is used or allocated.

6. The method of claim 2, wherein the metadata includes mapping information used to map logical addresses to physical locations on the non-volatile physical storage devices of the data storage system.

7. The method of claim 1, wherein determining whether there is a sufficient amount of existing free capacity to grant the first amount includes determining that the user data pool includes a sufficient amount of existing free capacity to grant the first amount, and wherein the method includes granting the first amount using free capacity from the user data pool.

8. The method of claim 7, wherein the user data pool is configured in accordance with a first RAID level and configuration and the metadata pool is configured in accordance with a second RAID level and configuration different from the first RAID level and configuration.

9. The method of claim 2, wherein determining whether there is a sufficient amount of existing free capacity to grant the first amount includes determining that the metadata pool includes a sufficient amount of existing free capacity to grant the first amount, and wherein the method includes granting the first amount using free capacity from the metadata pool.

10. The method of claim 9, wherein the user data pool and the metadata pool are configured in accordance with a same RAID level and configuration.

11. The method of claim 1, wherein when in the read only mode, the data storage system only services read requests and does not service other requests that result in consumption of physical storage of the non-volatile physical storage devices providing backend storage in the data storage system.

12. The method of claim 1, wherein when in the read only mode, the data storage system does not service write requests.

13. The method of claim 4, wherein each of the plurality of predetermined thresholds denotes a different utilization threshold.

14. The method of claim 4, the plurality of priorities is ranked from a highest priority to a lowest priority and wherein the highest priority is associated with a highest one of the plurality of predetermined thresholds and the lowest priority is associated with a lowest one of the plurality of predetermined thresholds.

15. A system comprising:
one or more processors; and
one or more memories comprising code stored thereon that, when executed, perform a method of managing storage comprising:
receiving a request for a first amount of free capacity, wherein the request includes a first priority denoting a purpose for which the first amount of free capacity is requested, wherein the request is requesting the first amount of free capacity from non-volatile physical storage devices;
determining whether a current utilization of storage of the non-volatile physical storage devices exceeds a first threshold associated with the first priority;
responsive to determining the current utilization of storage of the non-volatile physical storage devices is less than the first threshold associated with the first priority, performing first processing including:

determining whether there is a sufficient amount of existing free capacity in the non-volatile physical storage devices to grant the first amount; and responsive to determining there is a sufficient amount of existing free capacity in the non-volatile physical storage devices to grant the first amount, granting the first amount of free capacity of the non-volatile physical storage devices;

responsive to determining the current utilization of storage of the non-volatile physical storage devices is not less than the first threshold associated with the first priority, rejecting the request and not granting the first amount of free capacity;

wherein the non-volatile physical storage devices include a first portion configured as a user data pool for storing user data and a second portion configured as a metadata pool for storing metadata;

determining that the data storage system is in a read only mode;

determining that the metadata pool has a first current amount of free capacity below a specified threshold;

responsive to determining that the metadata pool has the first current amount of free capacity below the specified threshold, shifting free capacity from the user data pool to the metadata pool to increase free capacity of the metadata pool; and in response to increasing free capacity of the metadata pool, transitioning the data storage system out of read only mode so that the data storage system is able to service write requests.

16. A non-transitory computer readable medium comprising code stored thereon that, when executed, performs a method of managing storage comprising:

receiving a request for a first amount of free capacity, wherein the request includes a first priority denoting a purpose for which the first amount of free capacity is requested, wherein the request is requesting the first amount of free capacity from non-volatile physical storage devices;

determining whether a current utilization of storage of the non-volatile physical storage devices exceed; a first threshold associated with the first priority;

responsive to determining the current utilization of storage of the non-volatile physical storage devices less than the first threshold associated with the first priority, performing first processing including:

determining whether there is a sufficient amount of existing free capacity in the non-volatile physical storage devices to grant the first amount; and responsive to determining there is a sufficient amount of existing free capacity in the non-volatile physical storage devices to grant the first amount, granting the first amount of free capacity of the non-volatile physical storage devices;

responsive to determining the current utilization of storage of the non-volatile physical storage devices not less than the first threshold associated with the first priority, rejecting the request and not granting the first amount of free capacity;

wherein the non-volatile physical storage devices include a first portion configured as a user data pool for storing user data and a second portion configured as a metadata pool for storing metadata;

determining that the data storage system is in a read only mode;

determining that the metadata pool has a first current amount of free capacity below a specified threshold;

responsive to determining that the metadata pool has the first current amount of free capacity below the specified threshold, shifting free capacity from the user data pool to the metadata pool to increase free capacity of the metadata pool; and in response to increasing free capacity of the metadata pool, transitioning the data storage system out of read only mode so that the data storage system is able to service write requests.

17. The non-transitory computer readable medium of claim 16, wherein the non-volatile physical storage devices provide backend storage in a data storage system.

18. The non-transitory computer readable medium of claim 17, wherein the current utilization denotes a percentage regarding an amount of the physical storage of the non-volatile physical storage devices of the data storage system that is used or allocated.

* * * * *